US010057647B1

(12) United States Patent
Marconcini et al.

(10) Patent No.: US 10,057,647 B1
(45) Date of Patent: Aug. 21, 2018

(54) METHODS AND SYSTEMS FOR LAUNCHING MULTIMEDIA APPLICATIONS BASED ON DEVICE CAPABILITIES

(71) Applicant: Rovi Guides, Inc., San Carlos, CA (US)

(72) Inventors: Stefano Marconcini, Palo Alto, CA (US); David D. Shoop, San Jose, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 15/726,604

(22) Filed: Oct. 6, 2017

Related U.S. Application Data

(60) Provisional application No. 62/552,714, filed on Aug. 31, 2017.

(51) Int. Cl.
| | |
|---|---|
| *H04N 21/462* | (2011.01) |
| *H04N 21/478* | (2011.01) |
| *H04N 21/41* | (2011.01) |
| *H04N 21/482* | (2011.01) |

(52) U.S. Cl.
CPC ....... *H04N 21/462* (2013.01); *H04N 21/4113* (2013.01); *H04N 21/4122* (2013.01); *H04N 21/478* (2013.01); *H04N 21/482* (2013.01)

(58) Field of Classification Search
None
See application file for complete search history.

(56) References Cited

U.S. PATENT DOCUMENTS

| | | |
|---|---|---|
| 6,239,794 B1 | 5/2001 | Yuen |
| 6,564,378 B1 | 5/2003 | Satterfield |
| 7,165,098 B1 | 1/2007 | Boyer |
| 7,761,892 B2 | 7/2010 | Ellis |
| 8,046,801 B2 | 10/2011 | Ellis |
| 2002/0174430 A1 | 11/2002 | Ellis |
| 2005/0251827 A1 | 11/2005 | Ellis |
| 2010/0153885 A1 | 6/2010 | Yates |

*Primary Examiner* — Pankaj Kumar
*Assistant Examiner* — Charles N Hicks
(74) *Attorney, Agent, or Firm* — Haley Guiliano LLP

(57) ABSTRACT

Methods and systems are disclosed herein for determining which of two multimedia devices to use when launching an Internet multimedia application. A user may interact directly with a first device and select an application from the first device. The first device will determine whether the selected application is present on a second device and whether the capabilities of the second device make it a better choice for launching the selected application. If the first device is chosen, multimedia data is transmitted from the first device though the second device to a display. If the second device is chosen, the first device sends a command to the second device to launch the selected application and multimedia data is sent from the second device to a display.

20 Claims, 22 Drawing Sheets

METHODS AND SYSTEMS FOR LAUNCHING MULTIMEDIA APPLICATIONS BASED ON DEVICE CAPABILITIES

CROSS-REFERENCE TO RELATED APPLICATION

This application claims the benefit of U.S. Provisional Application No. 62/552,714, filed Aug. 31, 2017, which is hereby incorporated by reference herein in its entirety.

BACKGROUND

The amount of media available to users has grown tremendously in the last few years. Media assets are available in many formats and resolutions, and are available from many different sources, including broadcast TV, cable TV, and through over-the top (OTT) Internet streaming services (e.g., Netflix®, Hulu®, iTunes®, or other sources). As media formats change, older set-top boxes and other similar media devices may not be able to process the media they receive. This forces users to purchase expensive new hardware to replace their current set-top boxes if they wish to access the more advanced media formats. Also, as new applications become available to launch using set-top boxes, the processing powers of the legacy set-top boxes may not suffice to adequately execute such new applications. This introduces severe lag in accessing such new applications making the user experience less enjoyable.

SUMMARY

A set-top box or other multimedia receiver may receive multimedia signals in a variety of formats and with a variety of multimedia specifications. For example, some signals may contain standard definition video, while others contain high definition video. For example, some signals may include audio data with a high low sampling rate while other signals may contain audio data with a high sampling rate. A set-top box may also run multimedia applications such as an OTT Internet streaming applications. The system resources needed to run an OTT Internet streaming application may vary for each application. A set-top box may not have all the capabilities necessary to process incoming multimedia signals, or run certain applications. If a set-top box is not capable of processing the multimedia signal, or run a particular application, a second device may be connected to the set-top box which enhances, augments, or supplements the capabilities of the set-top box. The set-top box can then pass a multimedia signal that exceeds its capabilities to the second device which has the capabilities necessary to process the signal. If a multimedia application requires more available RAM than the set-top box can provide, the set-top box may instruct the second device to run the application.

The multimedia output of a set-top box or other multimedia signal receiver is connected to the multimedia input of a second device. The set-top box multimedia output is routed through the second device directly to a display device, such as a TV, if the capabilities of the set-top box are suitable for the signal. If the capabilities of the set-top box are not suitable, the set-top box passes the multimedia signal to the second device and instructs the second device to process the multimedia signal and output the processed signal to a display.

Methods and systems are disclosed herein for outputting multimedia data to a display generated from a multimedia signal having varying multimedia specifications. For example, a multimedia signal may have a set of multimedia specifications which may include video resolution, audio sampling rate, aspect ratio, or any other specification relating to the audio or video properties of the multimedia data contained within the multimedia signal. The multimedia signal may be received at a first stand-alone device such as a set-top box or other television receiver from a cable or satellite television provider, terrestrial broadcast, or from an OTT Internet streaming service such as Netflix®, Hulu®, YouTube®, and the like.

The first stand-alone device may have different capabilities than a second stand-alone device. For example, a set-top box may lack an Internet connection to receive media from streaming services, or may not have sufficient memory capacity to download streaming media. For example, a set-top box may not have sufficient processing capabilities to decode higher resolution (e.g., HD video, and 4K) media assets. A second stand-alone device with greater capabilities may be connected to the first stand-alone device to supplement its capabilities.

In some embodiments, the second stand-alone device is capable of decoding higher resolution videos than the first stand-alone device. If a user selects a high-resolution video, the signal may be passed to, and processed by, the second stand-alone device.

In some embodiments, the second stand-alone device is capable of launching an Internet video streaming application quickly and display Internet streaming content with minimal lag time, while the first stand-alone device requires more time to launch the application, display Internet streaming content with significant lag, or both. Use of the second stand-alone device allows the user to view streaming video content from Internet services more smoothly.

In some embodiments, the first stand-alone device may receive a user selection of a multimedia application. The first stand-alone device may retrieve a set of capabilities of the first stand-alone device and a set of capabilities of the second stand-alone device, as well as a listing of multimedia applications available on the first stand-alone device and a list of multimedia application available on the second stand-alone device. The first stand-alone device may compare the capabilities and available multimedia applications to determine which device to use for launching the selected application. If the first stand-alone device is used, the application may be launched, the multimedia signal processed, and the multimedia data of the multimedia signal transmitted to the second stand-alone device for output. If the second stand-alone device is used, a command may be transmitted from the first stand-alone device to the second stand-alone device to launch the selected application.

In some embodiments, determining which device to use comprises measuring the time needed to launch the selected application on each device to determine which is faster.

In some embodiments, the second stand-alone device is responsive to voice commands, while the first stand-alone device is responsive to traditional user input devices such as a remote control. Use of the second stand-alone device allows the user to control the multimedia experience using voice commands.

In some embodiments, the first stand-alone device comprises a user input device with a dedicated button associated with a customizable function that is customized to operate the second stand-alone device. The first stand-alone device may receive a user selection of the dedicated button, interpret a command associated with the customizable function and relay the command to the second stand-alone device.

In some embodiments, the interpreted command comprises a command to launch a multimedia application that is not resident on the first stand-alone device.

In some embodiments, the second stand-alone device receives commands from a user input device. The user input device may be an integrated control panel, a remote control, a smartphone, or any other suitable user input device. The second stand-alone device my also receive commands from the first stand-alone device. These commands may be user input commands that are received from a user input device associated with the first stand-alone device which are relayed to the second stand-alone device, or they may be issued by the first stand-alone device without any user input.

In some embodiments, the first stand-alone device transmits the source multimedia signal received by the first stand-alone device to the second stand-alone device. The signal may be transmitted using a data connection or a multimedia connection.

In some embodiments, the first stand-alone device may receive and/or process a source multimedia signal with video data having one video resolution, and the second stand-alone device may receive and process a source multimedia signal with video data have a second vide resolution. In some embodiments, the multimedia data of the two signals are combined in a single picture-in-picture display, in which one video is overlaid on top of the other video.

In some embodiments, the second stand-alone device comprised a video decoding engine to process the source multimedia signal. The decoding engine may output a processed video signal to the first input of a multiplexer. The multiplexer may be configured to receive multimedia data processed by the first stand-alone device as a second input. The output of the multiplexer may be routed through the multimedia output of the second stand-alone device.

In some embodiments, the multiplexer may output the multimedia data of one input and not the other. In some embodiments, the multiplexer may receive instructions to select one of the outputs for coupling with the multimedia output of the second stand-alone device.

In some embodiments, a media guidance application may reside on either the first stand-alone device or the second stand-alone device. In some embodiments, a media guidance application may be distributed across both the first stand-alone device and the second stand-alone device.

In some embodiments the second stand-alone device may receive multimedia signals from the first stand-alone device through a multimedia input connection such as HDMI, DVI, component, composite, or any other suitable connection. The second stand-alone device may also receive other types of signals from the first stand-alone device, such as user input, through an input connection such as Ethernet, HDMI 1.4A (Ethernet over HDMI), radio, infrared, or any other suitable connection.

In some embodiments, the second stand-alone device may transmit multimedia signals to a display. The display may be integral to the device, or may be externally connected (e.g., a TV) through any suitable multimedia connection such as those listed above.

DETAILED DESCRIPTION

Figure 1:
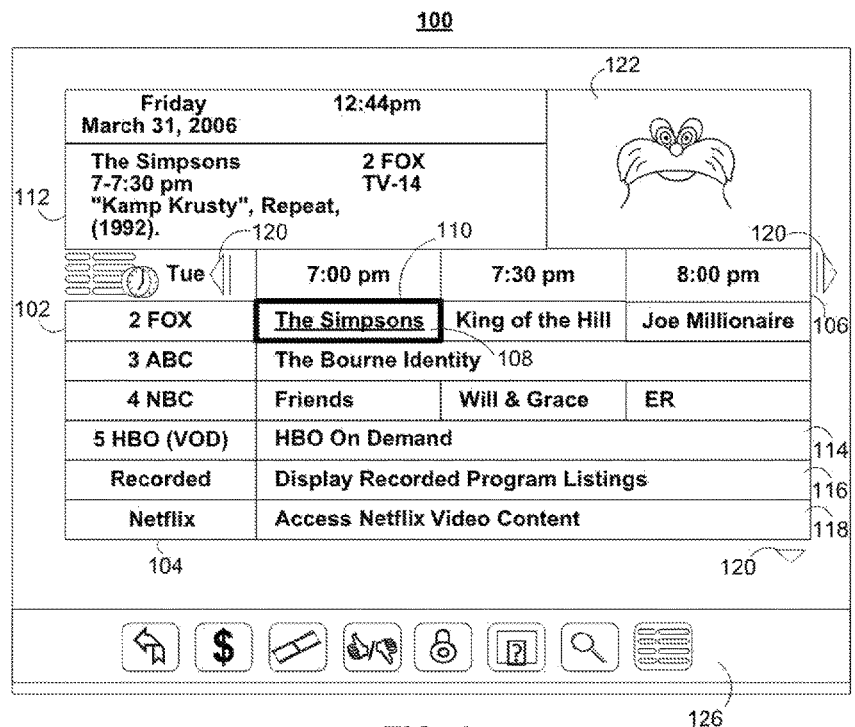
FIG. 1 shows an illustrative display screen that may be used to provide media guidance data according to an embodiment of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
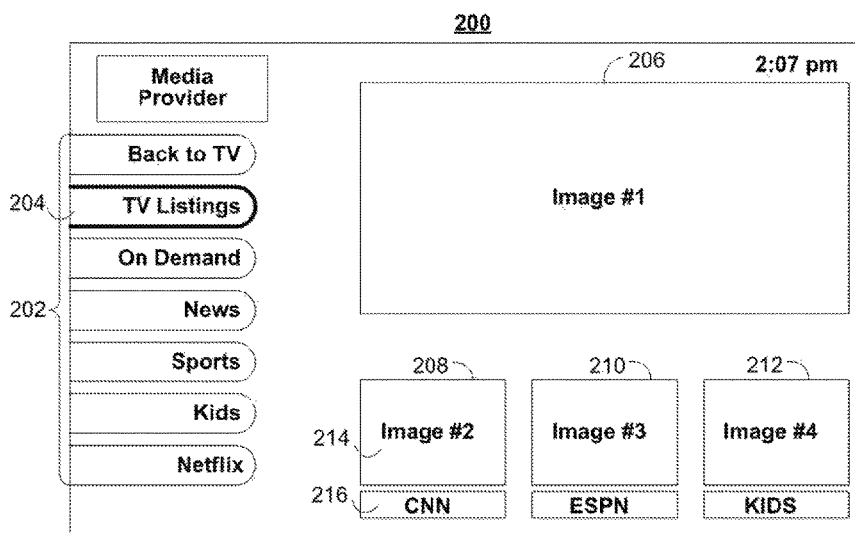
FIG. 2 shows an illustrative display screen that may be used to provide media guidance data according to an embodiment of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Some non-linear programming is provided by OTT applications. If an OTT non-linear program is selected from the interactive program guide, a set-top box may instruct a second device to launch the OTT application and access the selected program for output to a display. Other programs may be accessible directly by the set-top box. Such programs may be received by the set-top box and routed through the second device for display.

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
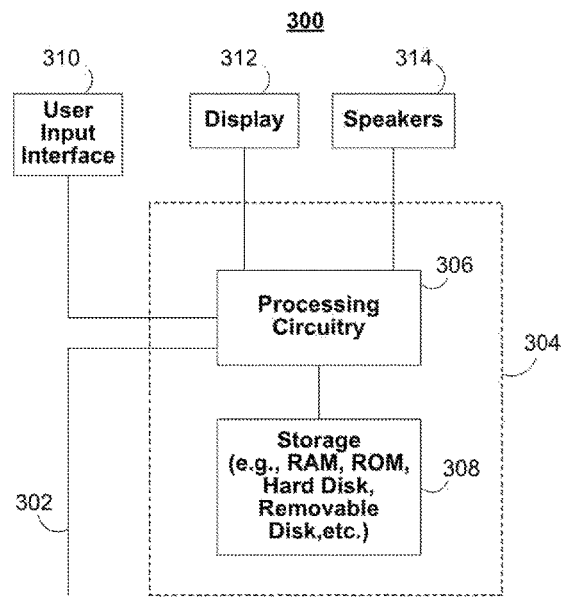
FIG. 3 shows a generalized embodiment of a stand-alone device according to an embodiment of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
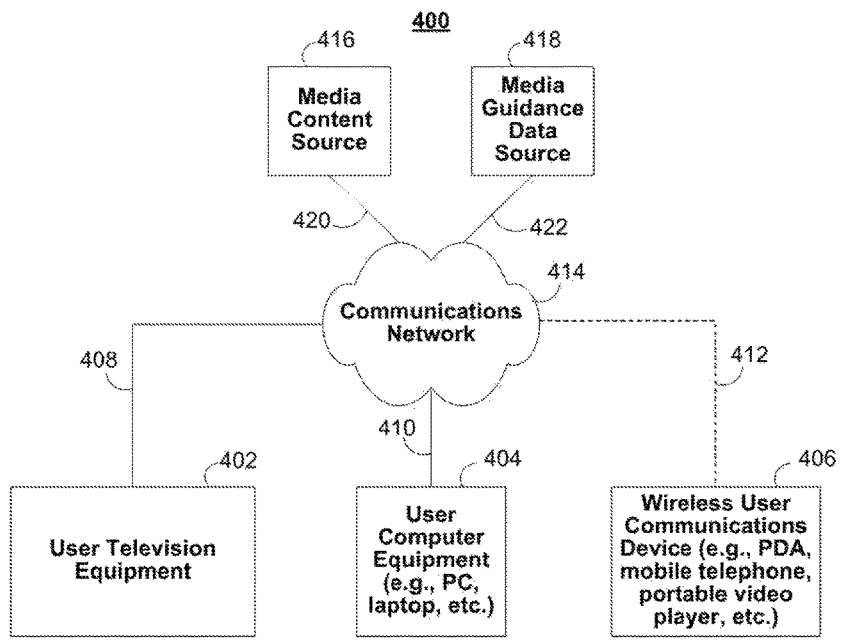
FIG. 4 shows a specific implementation of user devices according to an embodiment of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE®, NETFLIX®, and HULU®, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 5:
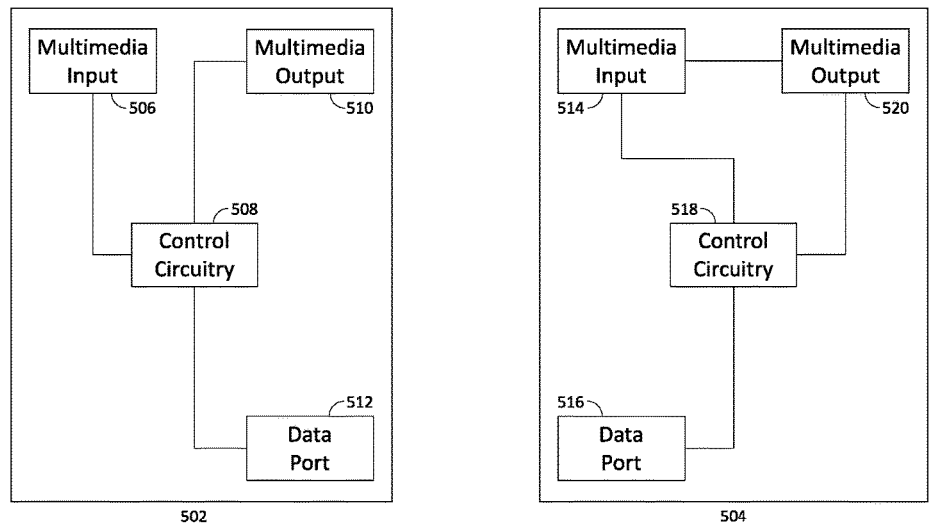
FIG. 5 is a block diagram representing the elements of a system according to an embodiment of the disclosure.

The block diagram in FIG. 5 represents one embodiment of the present disclosure. First stand-alone device 502 may be a set-top box or other television or multimedia signal receiver and may include a multimedia input 506 at which the first stand-alone device 502 may receive a source multimedia signal such as a cable television signal, control circuitry 508, a multimedia output 510, and a data port 512. In some implementations, control circuitry 508 may be based on control circuitry 304. The multimedia input 506 may include a coaxial cable connector, component input jacks, composite input jacks, an HDMI connector, or any other suitable multimedia signal input connection. Similarly, the multimedia output 510 may include any of the above types of connections or any other suitable multimedia output connection. The data port 512 may include an Ethernet connecter, a USB connector, or a connector for any other type of cable suitable for transmitting data between devices. In some embodiments, the multimedia output 510 and the data port 512 are electronic components coupled to a single physical output connector, such as an HDMI connector compatible with HDMI 1.4 (Ethernet over HDMI).

Second stand-alone device 504 similarly includes a multimedia input 514 and a data port 516. Multimedia input 514 may include any type of connection listed above in relation to multimedia output 510. Data port 516 may include any type of connection listed above in relation to data port 512. Multimedia input 514 and data port 516 may also be electronic components coupled to a single physical input connector, such as an HDMI connector compatible with HDMI 1.4 (Ethernet over HDMI). Second stand-alone device 504 further includes control circuitry 518 and multimedia output 520. In some implementations, control circuitry 518 may be based on control circuitry 304. Multimedia output 520 may include any type of connection listed above in relation to multimedia output 510.

In the first stand-alone device, multimedia input 506 is coupled to control circuitry 508. A source multimedia signal is received by the first stand-alone device at multimedia input 506 and may originate from any suitable source including, but not limited to, terrestrial broadcast television, cable television, and satellite television. The source multimedia signal may be in any format suitable for transmission of multimedia data, including but not limited to, UHF or VHF radio signals, MPEG-2 transport streams, and MPEG-4 transport streams. Control circuitry 508 is configured to detect multimedia specifications of the source multimedia signal received at multimedia input 506, and process the source multimedia signal to obtain multimedia data thereof if the multimedia specifications of the source multimedia signal do not exceed the capabilities of the first stand-alone device 502. For example, control circuitry 508 may obtain data relating to the multimedia specifications of the multimedia signal from interactive program guide listings data. Specifically, the interactive program guide data may be configured to include multimedia specifications for each program. In response to user selection of a program listing from the interactive program guide, control circuitry 508 may retrieve the multimedia specification information for the selected program from the program listing data. Control circuitry 508 may also retrieve known multimedia specifications from a database. Specifically, control circuitry 508 may receive a program identifier in response to a user selection of a program from the interactive program guide. Control circuitry 508 may then access a database containing multimedia specifications for each program. Using the program identifier received from the interactive program guide, the control circuitry 508 may look up the identified program and retrieve the multimedia specifications for that program. The database may be stored locally within memory (e.g., storage 308), or may be stored remotely, such as on a server (e.g., media guidance data source 418).

Alternatively, control circuitry 508 may analyze data packets within the multimedia signal relating to the multimedia specifications of the signal. Specifically, the multimedia signal may contain control packets or other data structures containing metadata relating to the multimedia specifications of the multimedia data contained within the multimedia signal. For example, the first stand-alone device 502 may receive a signal encapsulated in an MPEG-2 transport stream. MPEG-2 is an international standard and the transport stream structure therefor is defined in ISO/IEC 13818-1. An exemplary MPEG-2 transport stream is composed of packets 188 bytes in length. The first several bytes of each packet comprise a header region. The header region contains control information and metadata regarding the type of media data contained in the remainder of the packet, referred to as the payload. The control information and metadata may include flags relating to the multimedia specifications of the media within the payload. Additionally, the ATSC standard for broadcast television signals requires additional information about the programs contained within an MPEG-2 transport stream to be included using the Program Specific Information Protocol, defined in ATSC A/69. Some of the data structures required by the PSIP may include information relating to the multimedia specifications of each program contained within the MPEG-2 transport stream. Control circuitry 508 may be configured to access any of such packets or data structures, or any other suitable packets or data structures to extract the multimedia specifications. Alternatively, multimedia specifications may be located in a header portion of at least some of the multimedia data packets contained within the multimedia signal. The payload of an MPEG-2 transport stream may contain an entire packet of media in a different transport format, such as MPEG-4. MPEG-4 is an international standard and the format therefor is defined in ISO/IEC 14496-1. MPEG-4 streams include descriptor streams which provide data about the media contained in the stream. One item included in the descriptor stream is an initial object descriptor. The initial object descriptor includes, among other things, information relating to the audio and video profiles needed to process the media data. Control circuitry 508 may be configured to access this data without processing the multimedia data contained within the packets in order to retrieve the multimedia specifications contained therein.

Control circuitry 508 is further coupled to multimedia output 510 to transmit the multimedia data to the second stand-alone device 504, and data port 512 to transmit a command to the second stand-alone device 504 to output the multimedia data. If the multimedia specifications of the source multimedia signal do exceed the capabilities of the first stand-alone device 502, the control circuitry 508 is further configured to forego processing of the source multimedia signal and transmit the unprocessed source multimedia signal via the data port 512 to the second stand-alone device 504, along with a command to process the source multimedia signal. The unprocessed source multimedia signal may be the raw modulated signal as received a multimedia input 506, or may be data obtained from the tuned channel. Data obtained from the tuned channel may be, for example, an MPEG-4 transport stream obtained from the tuned channel by the first stand-alone device 502, or may be partially decoded multimedia data from the tuned channel (e.g., decoded audio data and encoded video data). In some embodiments, the unprocessed multimedia signal is transmitted from the multimedia output 510 to the second stand-alone device 504, while the processing command is transmitted via the data port 512.

In the second stand-alone device, multimedia input 514 and data port 516 are coupled to control circuitry 518. Control circuitry 518 is further coupled to multimedia output 520. Additionally, multimedia input 514 is directly coupled to multimedia output 520. If the second stand-alone device 504 receives a command at data port 516 from data port 512 of the first stand-alone device 502 to output multimedia data processed by the first stand-alone device 502 and transmitted from multimedia output 510 to multimedia input 514, control circuitry 518 is configured to direct multimedia input 514 to transmit multimedia data directly to multimedia output 520. Second stand-alone device 504 may also include a multiplexer module or other similar module which may accept multiple multimedia data streams as input. The multiplexer may be implemented in software, firmware, or hardware, and may be part of control circuitry 518 or multimedia output 520, or may be a separate component. Processed multimedia data that is ready for output may be routed through the multiplexer. Based on instructions received from control circuitry 518, the multiplexer may output a first multimedia data stream or a second multimedia data stream, of a combination thereof. For example, the multiplexer may receive multimedia data processed by the first stand-alone device as a first multimedia data stream, and multimedia data processed by the second stand-alone device as a second multimedia data stream. The control circuitry 518 may, automatically or in response to a user command, instruct the multiplexer to output only the first multimedia data stream. The control circuitry 518 may generate a picture-in-picture output by combining one multimedia data stream with an overlay or side-by-side display of another multimedia data stream.

Figure 6:
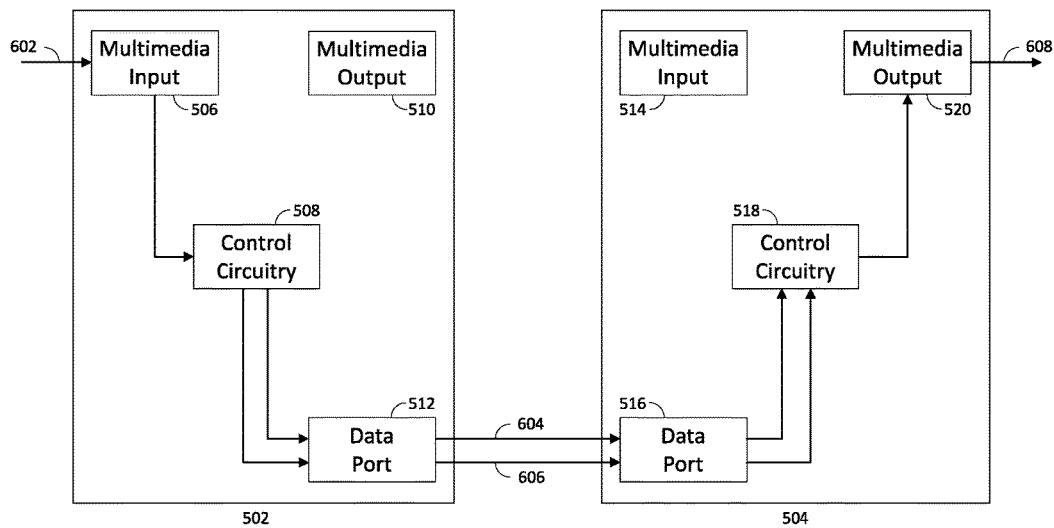
FIG. 6 is a block diagram representing the path of multimedia data and other data according to an aspect of an embodiment of the disclosure.

The block diagram in FIG. 6 shows an aspect of an embodiment of the present disclosure wherein the multimedia specifications of the source multimedia signal exceed the capabilities of the first stand-alone device 502. The source multimedia signal 602 is received at multimedia input 506. The source multimedia signal 602 is communicated to control circuitry 508 where the multimedia specifications are analyzed and compared to the capabilities of the first stand-alone device 502. When the control circuitry 508 determines that the multimedia specifications exceed the capabilities of the first stand-alone device 502, the control circuitry 508 communicates the source multimedia signal 602 in an unprocessed form to data port 512, as well as a command for the second stand-alone device 504 to process the source multimedia signal. For example, the control circuitry 508 does not perform any processing operations on the source multimedia signal 602 and allows the source multimedia signal 602 to pass through control circuitry 508 to be output. The unprocessed source multimedia signal 604 is thus unchanged from the source multimedia signal 602. Alternatively, if the source multimedia signal encapsulates another media stream (e.g., the source multimedia signal is an MPEG-2 transport stream that encapsulates an MPEG-4 stream), control circuitry 508 may extract the media stream packets from the source multimedia signal and transmit those packets to the second stand-alone device, thus reducing the amount of data transmitted between the first and second stand-alone devices and, consequently, reducing the time and processing power needed for the second stand-alone device to process the multimedia signal. The unprocessed source multimedia signal 604 is transmitted, along with the processing command 606 to data port 516 of the second stand-alone device 504.

The unprocessed source multimedia signal 604 and the processing command 606 are received by the second stand-alone device 504 at data port 516, and are communicated to control circuitry 518. Control circuitry 518 is configured to process the source multimedia signal to obtain multimedia data. Processing may be achieved by accessing and extracting the multimedia data contained within the source multimedia signal. As an example, the source multimedia signal may be an MPEG-2 transport stream encapsulating an MPEG-4 transport stream, which further encapsulates a video elementary stream and an audio elementary stream. Control circuitry 518 accesses the proper packets from the MPEG-2 stream by consulting the program map table contained in the MPEG-2 stream metadata (as defined in the ISO/IEC standard). The program map table informs the control circuitry which packets belong to a particular program. Using this information, MPEG-2 decoding logic within the control circuitry 518 obtain the MPEG-4 packets relating to the selected program. Control circuitry 518 then accesses the MPEG-4 metadata to identify the packets belonging to the video elementary stream and the audio elementary stream. Using this information, the proper packets are extracted and the data contained therein routed through video and audio decoding engines, resulting in processed multimedia data that is ready to be output. In some cases, the first stand-alone device 502 may possess the multimedia capabilities necessary to process the video or audio data, but not both. The first stand-alone device 502 would then transmit, for example, the processed audio data and the unprocessed video data to the second stand-alone device 504. Control circuitry 518 then processes the video data as above. In any case, once all multimedia data of the selected program have been processed, control circuitry 518 is configured to transmit the multimedia data to multimedia output 520.

Figure 7:
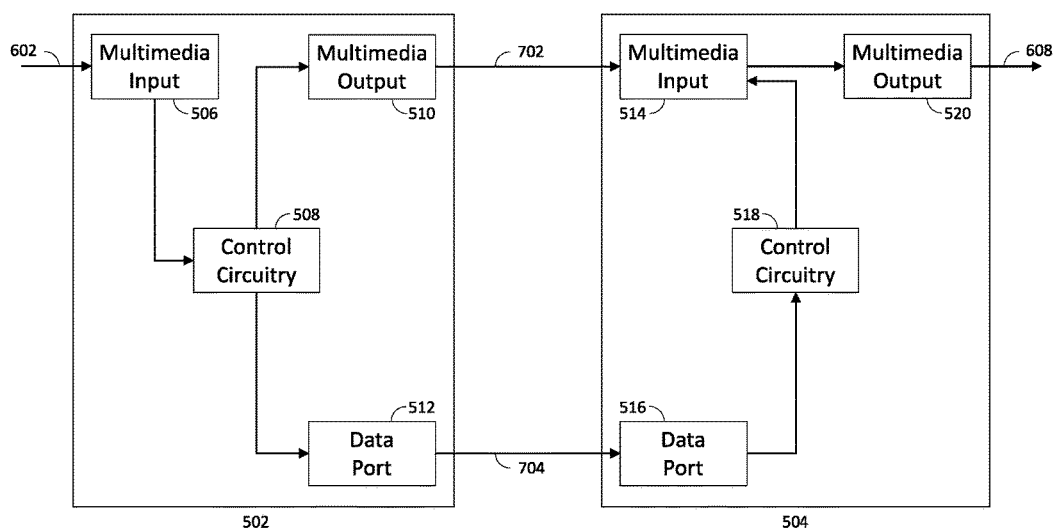
FIG. 7 is a block diagram representing the path of multimedia data and other data according to an aspect of an embodiment of the disclosure.

The block diagram in FIG. 7 shows another aspect of an embodiment of the present disclosure wherein the multimedia specifications of the source multimedia signal 602 do not exceed the capabilities of the first stand-alone device 502. The source multimedia signal 602 is received at multimedia input 506 and communicated to control circuitry 508. Control circuitry 508 is configured to process the source multimedia signal 602 to obtain multimedia data 702, and transmit the multimedia data 702 to multimedia output 510. Control circuitry 508 also communicates a command 704 to output the multimedia data without any further processing to data port 512 to transmit to the second stand-alone device 504.

The second stand-alone device 504 receives the multimedia data 702 at multimedia input 514, and the output command 704 at data port 516. Output command 704 is communicated to control circuitry 518. Upon receiving the output command, control circuitry 518 instructs multimedia input 514 to transmit the multimedia data 702 directly to multimedia output 520.

Figure 8:
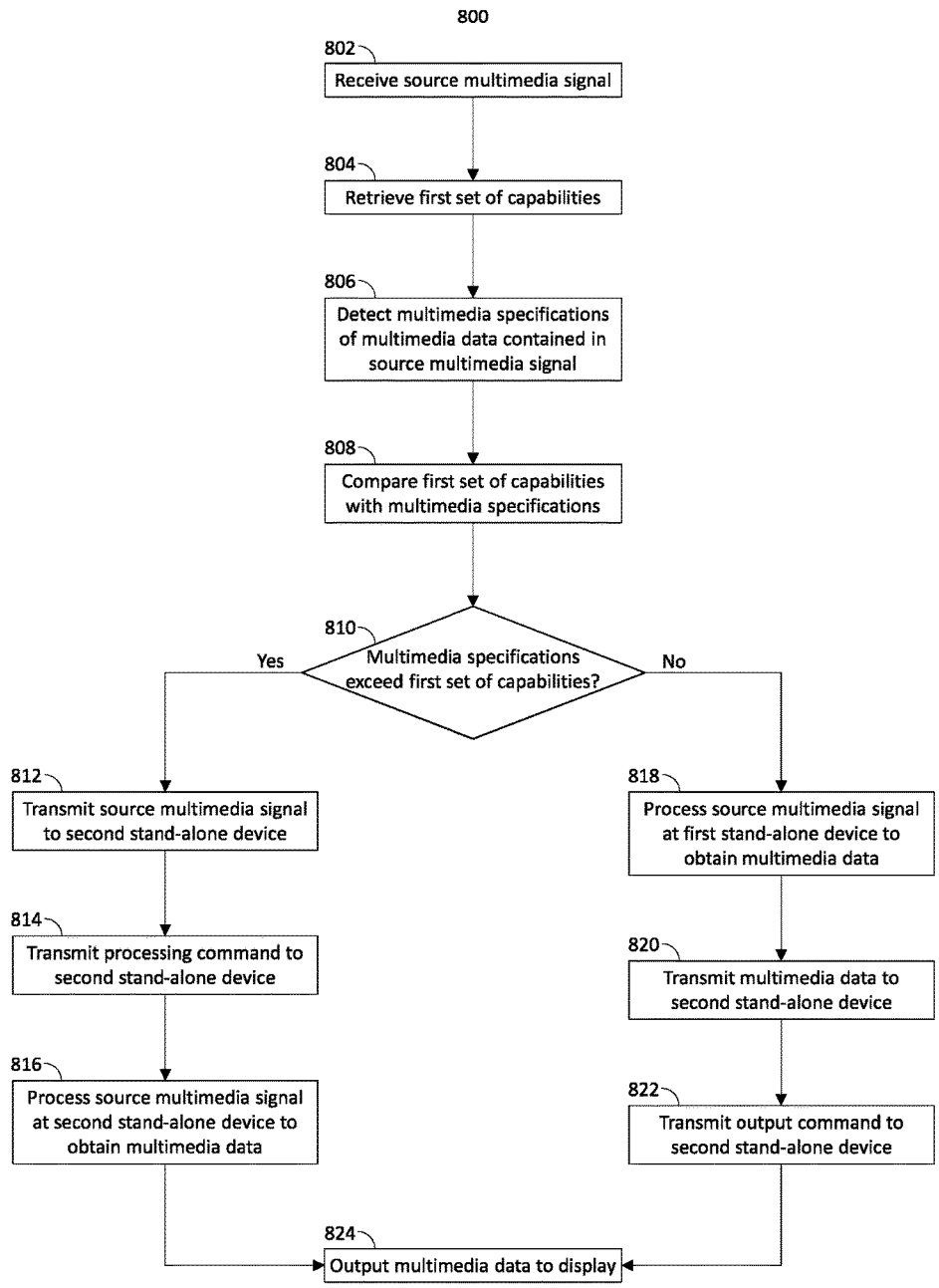
FIG. 8 is a flowchart representing a process of outputting the multimedia data according to an embodiment of the disclosure.

The flowchart in FIG. 8 describes the overall process of an embodiment of the present disclosure to output multimedia data. At step 802, the first stand-alone device receives a source multimedia signal (e.g., source multimedia signal 602). For example, first stand-alone device 502 may receive a multimedia signal from a television channel from a server. At step 804, the control circuitry of the first stand-alone device (e.g., control circuitry 508) retrieves a first set of capabilities of the first stand-alone device. The capabilities may include maximum decodable video resolution, maximum decodable audio sampling rate, video aspect ratio, closed caption ability, subtitle ability, SAP ability, available decoder engine (discussed further below), or any other capability relating to the output of multimedia data. A configuration file or other suitable data structure detailing the capabilities of the first stand-alone device 502 may be stored at a predefined memory location within a memory storage (e.g., storage 308), and may be accessed by control circuitry 508. Control circuitry 508 may copy the entirety of the configuration file to a RAM buffer or other volatile or non-volatile memory, or may extract specific data from the configuration file, such as data detailing the maximum value for each multimedia property to be found in the multimedia specifications. At step 806, control circuitry 508 detects the multimedia specifications of the received source multimedia signal. This may be accomplished in several ways. For example, the control circuitry 508 may directly analyze the video or audio properties of the multimedia signal, or control circuitry 508 may be configured to access control packets or data structures within the multimedia signal containing metadata to extract the multimedia specifications, for example, in an MPEG-2 transport stream as described above, or PSIP data contained therein. Alternatively, multimedia specifications may be located in a header portion of at least some of the multimedia data packets contained within the multimedia signal, for example, headers in an MPEG-4 stream encapsulated within an MEPG-2 transport stream as described above. Control circuitry 508 may be configured to access the data located in the header portion without processing the multimedia data contained within a body portion of the packets in order to retrieve the multimedia specifications contained therein. In another example, the control circuitry 508 may obtain the multimedia specifications from program listing data in the interactive program guide in response to user selection of a program. Specifically, the interactive program guide data may be configured to include multimedia specifications for each program. In response to user selection of a program from the interactive program guide, control circuitry 508 may retrieve the multimedia specification information for the selected program from the program listing data. Multimedia specification information may include video resolution, audio sampling rate, aspect ratio, availability of closed captions, availability of a secondary audio channel in accordance with SAP, and any other multimedia properties. Control circuitry 508 may also retrieve known multimedia specifications from a database, which may be stored locally or on a remote server. Specifically, control circuitry 508 may receive a program identifier in response to a user selection of a program from the interactive program guide. Control circuitry 508 may then access a database containing multimedia specifications for each program and look up the identified program to retrieve the multimedia specifications for that program. At step 808, the control circuitry 508 compares the capabilities of the first stand-alone device with the multimedia specifications of the multimedia data contained in the source multimedia signal to determine if the specifications exceed the capabilities of the first stand-alone device. To do this, the control circuitry 508 compares the multimedia specifications obtained at step 806 to capabilities retrieved in step 804. For example, the control circuitry 508 may compare a value in the configuration data relating to video resolution to a video resolution property of the multimedia signal found in the multimedia specifications. If the value of the property found in the multimedia specifications is higher than the value listed in the configuration data by a certain threshold amount, the control circuitry 508 will set a flag or Boolean value to note that at least one property of the multimedia specifications exceeds the capabilities of the first stand-alone device 502. At step 810, if, after comparing each property of the multimedia specifications to the configuration data, none of the property values exceeds the threshold for their respective capability values found in the configuration data, the control circuitry 508 will proceed to process the multimedia signal at step 818, which is further discussed below. If the capabilities of the first stand-alone device are exceeded, then, at step 812, the first stand-alone device 502 transmits the source multimedia signal and, at step 814, a command to process the source multimedia signal to the second stand-alone device 504. At step 816, the control circuitry of the second stand-alone device (e.g., control circuitry 518) processes the source multimedia signal to obtain multimedia data, and the multimedia data is output to a display at step 824.

If the capabilities of the first stand-alone device are not exceeded, then, at step 818, the control circuitry 508 of the first stand-alone device 502 processes the source multimedia signal to obtain multimedia data. At step 820, the first stand-alone device transmits the multimedia data and, at step 822, a command to output the multimedia data to the second stand-alone device 504. Finally, at step 824, the multimedia data is output to a display by the second stand-alone device 504.

Any of these steps described above with relation to FIG. 8 are optional and may be performed in any order or in parallel.

Figure 9:
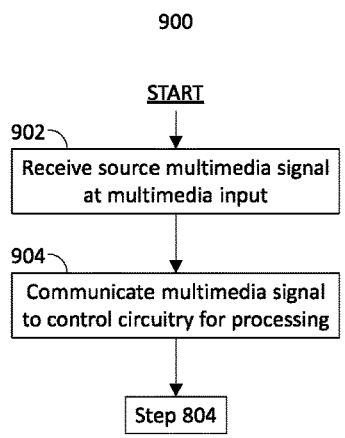
FIG. 9 is a flowchart representing a process for receiving a source multimedia signal at the first stand-alone device according to an embodiment of the disclosure.

The flowchart in FIG. 9 describes a process 900 implemented on control circuitry of the first stand-alone device (e.g., control circuitry 508) to receive a source multimedia signal in accordance with some embodiments of the disclosure. At step 902, the source multimedia signal is received at a multimedia input (e.g., multimedia input 506). The source multimedia signal may be received from a terrestrial television broadcast, a cable television media service provider, or any other suitable type of media content provider. At step 904, the received source multimedia signal is communicated to control circuitry 508 for analysis and processing.

Any of these steps described above with relation to FIG. 9 are optional and may be performed in any order or in parallel.

Figure 10:
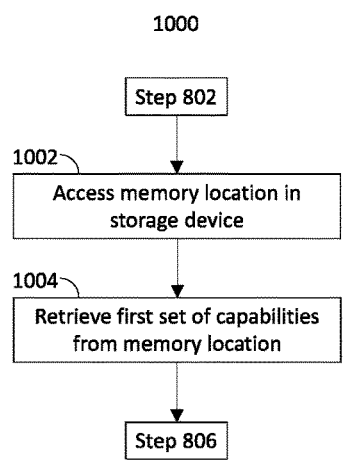
FIG. 10 is a flowchart representing a process for retrieving the capabilities of the first stand-alone device according to an embodiment of the disclosure.

The flowchart in FIG. 10 describes a process 1000 implemented on control circuitry of the first stand-alone device (e.g., control circuitry 508) to retrieve a set of capabilities of the first stand-alone device 502. At step 1002, control circuitry 508 may access a predefined memory location in a memory storage device (e.g., storage 308). The predefined memory location may contain a configuration file or other data structure containing data relating to the multimedia capabilities and system resources of the first stand-alone device. At step 1004, control circuitry 508 may retrieve the data stored in the predefined memory location. This can be accomplished in several ways. For example, control circuitry 508 may copy in its entirety the data stored in the predefined memory location, and store the copied data in a RAM buffer or other volatile or non-volatile memory. However, the data stored in the predefined memory location may include additional data that is not relevant to the multimedia capabilities of the first stand-alone device. Control circuitry 508 may therefore parse the configuration data and extract only those data relevant to the multimedia capabilities of the first stand-alone device, such as maximum decodable video resolution, maximum decodable audio sampling rate, closed-captioning ability, subtitle ability, SAP processing ability, available RAM, or available processing speed.

Any of these steps described above with relation to FIG. 10 are optional and may be performed in any order or in parallel.

Figure 11:
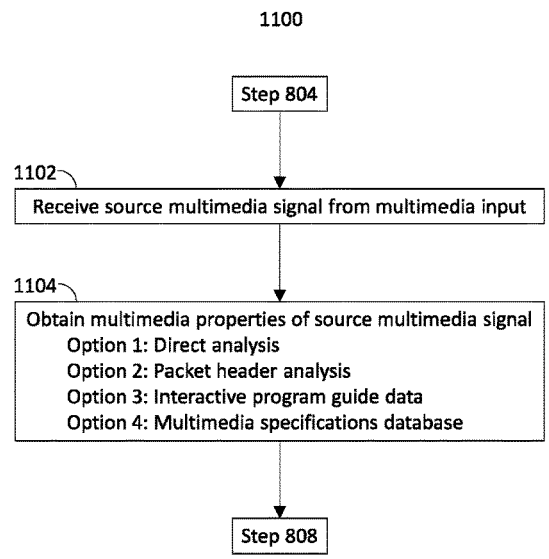
FIG. 11 is a flowchart representing a process for detecting multimedia specifications of the source multimedia signal according to an embodiment of the disclosure.

The flowchart in FIG. 11 describes a process 1100 implemented on control circuitry of the first stand-alone device (e.g., control circuitry 508) to detect the multimedia specifications of the multimedia data contained in the source multimedia signal. At step 1102, the control circuitry 508 receives the source multimedia signal from the multimedia input 506. At step 1104, control circuitry 508 analyzes and extracts the multimedia specifications from the source multimedia signal. As described above, this may be accomplished in several ways. For example, control circuitry 508 may access packet headers within the multimedia data, or metadata within an encapsulating transport stream. Control circuitry 508 may also access a database of known multimedia specifications for each program, or may retrieve such data from program guide data.

Any of these steps described above with relation to FIG. 11 are optional and may be performed in any order or in parallel.

Figure 12:
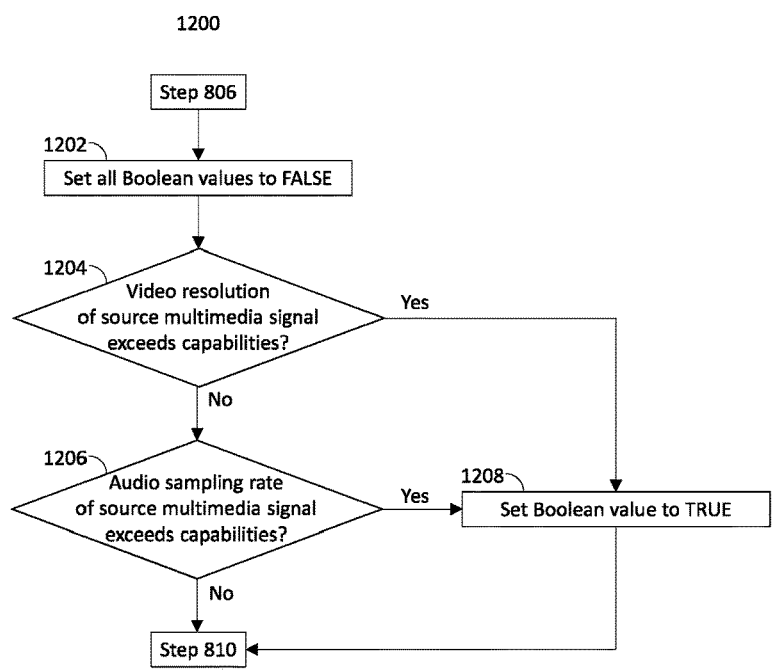
FIG. 12 is a flowchart representing a process for comparing the capabilities of the first stand-alone device with the multimedia specifications of the source multimedia signal according to an embodiment of the disclosure.

The flowchart in FIG. 12 describes a process 1200 implemented on control circuitry of the first stand-alone device (e.g., control circuitry 508) to compare the capabilities of the first stand-alone device with the multimedia specifications of the multimedia data contained in the source multimedia signal in accordance with some embodiments of the disclosure. At step 1202, control circuitry 508 initializes a set of Boolean variables, one for each property of the multimedia specifications, and sets the value of each variable to FALSE. As an example, steps 1204 and 1206 compare the video resolution property and audio sampling rate property of the multimedia specifications respectively with the capabilities of the first stand-alone device. If either property exceeds the capabilities of the first stand-alone device by a certain threshold amount then, at step 1208, the value of the corresponding Boolean variable is set to TRUE. This process is performed for each property of the multimedia specifications.

Any of these steps described above with relation to FIG. 12 are optional and may be performed in any order or in parallel.

Figure 13:
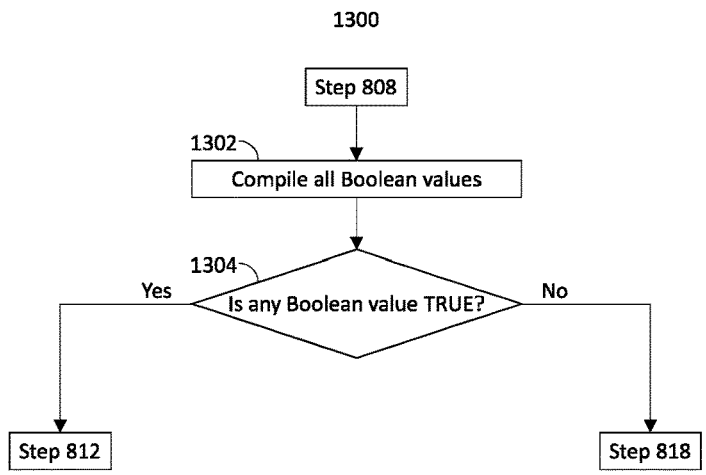
FIG. 13 is a flowchart representing a process for determining whether the multimedia specifications of the source multimedia signal exceed the capabilities of the first stand-alone device according to an embodiment of the disclosure.

The flowchart in FIG. 13 describes a process 1300 implemented on control circuitry of the first stand-alone device (e.g., control circuitry 508) to determine whether the multimedia specifications of the source multimedia signal exceed the capabilities of the first stand-alone device in accordance with some embodiments of the invention. At step 1302, control circuitry 508 compiles the Boolean variable initialized in step 1202. At step 1304, control circuitry checks the value of each Boolean variable. If any one Boolean variable is found to have a value of TRUE, the multimedia specifications of the multimedia data contained in the source multimedia signal are determined to exceed the capabilities of the first stand-alone device, and control circuitry 508 proceeds to step 812, described below in relation to FIG. 14. If all the Boolean variables have a value of FALSE, then the first stand-alone device capabilities meet or exceed the multimedia specifications of the multimedia data contained in the source multimedia signal, and control circuitry 508 proceeds to step 818, discussed below in relation to FIG. 17.

Any of these steps described above with relation to FIG. 13 are optional and may be performed in any order or in parallel.

Figure 14:
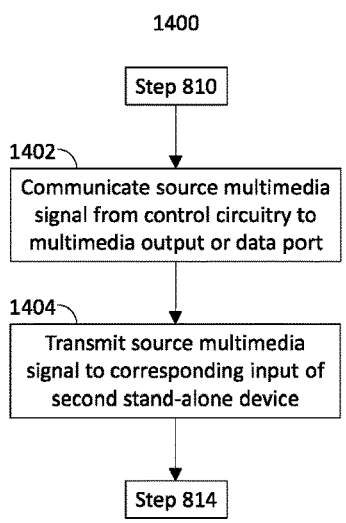
FIG. 14 is a flowchart representing a process for transmitting the source multimedia signal to the second stand-alone device according to an embodiment of the disclosure.

The flowchart in FIG. 14 describes a process 1400 implemented on control circuitry of the first stand-alone device (e.g., control circuitry 508) to transmit the source multimedia signal to the second stand-alone device 504 in accordance with some embodiments of the disclosure. At step 1402, control circuitry 508 communicates the source multimedia signal to the multimedia output 510 of the first stand-alone device 502. Alternatively, if the source multimedia signal is an MPEG-2 transport stream, and if the control circuitry is configured to isolate a given multimedia stream encapsulated therein, control circuitry 508 may communicate the isolated multimedia stream to the multimedia output 510. At step 1404, multimedia output 510 transmits the multimedia signal to the multimedia input 514 of the second stand-alone device 504.

Any of these steps described above with relation to FIG. 14 are optional and may be performed in any order or in parallel.

Figure 15:
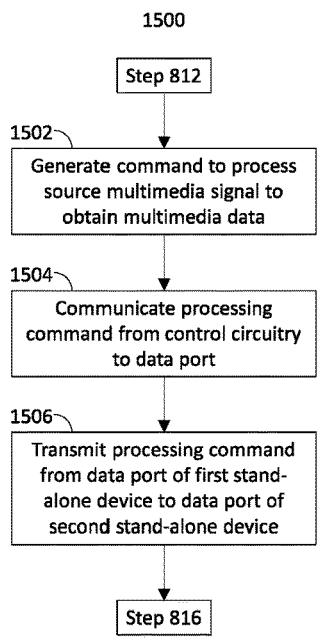
FIG. 15 is a flowchart representing a process for transmitting a processing command to the second stand-alone device according to an embodiment of the disclosure.

The flowchart in FIG. 15 describes a process 1500 implemented on control circuitry of the first stand-alone device (e.g., control circuitry 508) to transmit a processing command to the second stand-alone device 504 in accordance with some embodiments of the disclosure. At step 1502, control circuitry 508 generates a command to process the source multimedia signal to obtain the multimedia data contained therein. At step 1504, control circuitry 508 communicates the processing command to the data port 512. At step 1506, the processing command is transmitted to the data port 516 of the second stand-alone device 504.

Any of these steps described above with relation to FIG. 15 are optional and may be performed in any order or in parallel.

Figure 16:
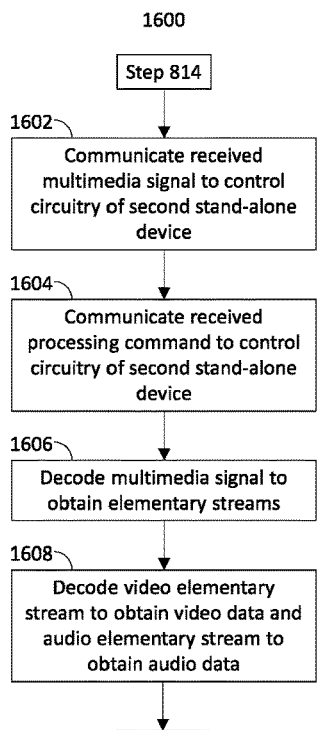
FIG. 16 is a flowchart representing a process for processing the source multimedia signal at the second stand-alone device according to an embodiment of the disclosure.

The flowchart in FIG. 16 describes a process 1600 implemented on control circuitry of the second stand-alone device (e.g., control circuitry 518) to process the source multimedia signal in accordance with some embodiments of the disclosure. At step 1602, the second stand-alone device 504 receives the multimedia signal at the multimedia input 514. In some cases, the first stand-alone device 502 may possess the multimedia capabilities necessary to process the video or audio data, but not both. The multimedia signal received at multimedia input 514 would then comprise, for example, the processed audio data and the unprocessed video data to the second stand-alone device 504. The multimedia signal is communicated to the control circuitry 518 of the second stand-alone device 504 for processing. At step 1604, the second stand-alone device receives the processing command at the data port 516. The processing command is then communicated to the control circuitry 518 of the second stand-alone device 504. At step 1606, the control circuitry 518 decodes the multimedia signal to obtain multimedia data composed of audio and video elementary streams. At step 1608, the elementary streams are decoded to obtain video data and audio data which is suitable for output. In cases where the first stand-alone device 502 is able to decode some data, the decoding performed at step 1608 is supplementary to that already performed by the first stand-alone device 502. The decoding of video data may be accomplished using a decoder engine. A video decoder engine may be implemented in software or in hardware and may accomplish decoding by decompression of received video data. Prior to broadcast, video data may be compressed to reduce the amount of data to be transmitted. Compression generally comprises a reduction in signal sampling rate through discrete cosine transform or other appropriate transform function, followed by chrominance subsampling (i.e., lowering the amount of chrominance information included in the video data relative to the amount of luminance information). Video decompression seeks to reverse these processes to restore the video to its original state. Different decoder engines may use different approaches to accomplish video restoration. This results in some decoder engine being more efficient, and some being more accurate in their decompression.

Any of these steps described above with relation to FIG. 16 are optional and may be performed in any order or in parallel.

Figure 17:
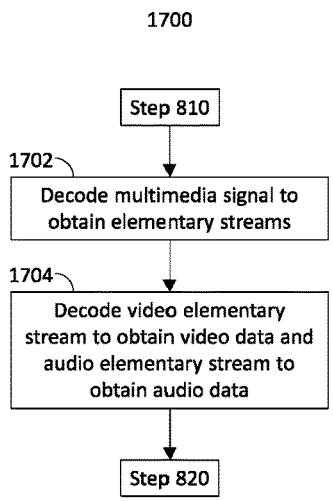
FIG. 17 is a flowchart representing a process for processing the source multimedia signal at the first stand-alone device according to an embodiment of the disclosure.

The flowchart in FIG. 17 describes a process 1700 implemented on control circuitry of the first stand-alone device (e.g., control circuitry 508) to process the source multimedia signal in accordance with some embodiments of the disclosure. At step 1702, control circuitry 508 of the first stand-alone device 502 decodes the multimedia signal to obtain multimedia data composed of elementary streams. At step 1704, the elementary streams are decoded to obtain video data and audio data which is suitable for output. The decoding of video data may be accomplished using a decoder engine as described above.

Any of these steps described above with relation to FIG. 17 are optional and may be performed in any order or in parallel.

Figure 18:
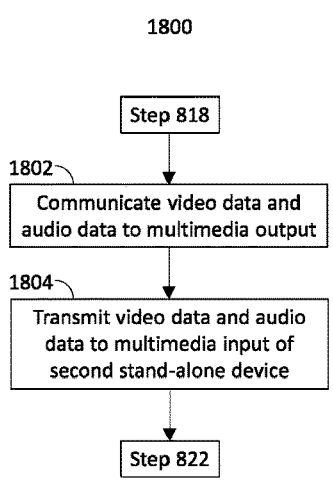
FIG. 18 is a flowchart representing a process for transmitting multimedia data of the source multimedia signal to the second stand-alone device according to an embodiment of the disclosure.

The flowchart in FIG. 18 describes a process 1800 implemented on control circuitry of the first stand-alone device (e.g., control circuitry 508) to transmit multimedia data to the second stand-alone device in accordance with some embodiments of the disclosure. At step 1802, the video data and audio data are communicated to the multimedia output 510. At step 1804, the video data and audio data are transmitted to the multimedia input 514 of the second stand-alone device 504.

Any of these steps described above with relation to FIG. 18 are optional and may be performed in any order or in parallel.

Figure 19:
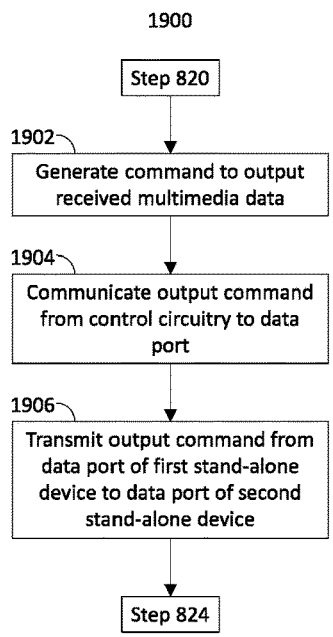
FIG. 19 is a flowchart representing a process for transmitting an output command to the second stand-alone device according to an embodiment of the disclosure.

The flowchart in FIG. 19 describes a process 1900 implemented on control circuitry of the first stand-alone device (e.g., control circuitry 508) to transmit an output command to the second stand-alone device 504 in accordance with some embodiments of the disclosure. At step 1902, control circuitry 508 generates a command to output the received video data and audio data without any further processing. At step 1904, the output command is communicated to the data port 512. At step 1906, the output command is transmitted from the data port 512 of the first stand-alone device 502 to the data port 516 of the second stand-alone device 504.

Any of these steps described above with relation to FIG. 19 are optional and may be performed in any order or in parallel.

Figure 20:
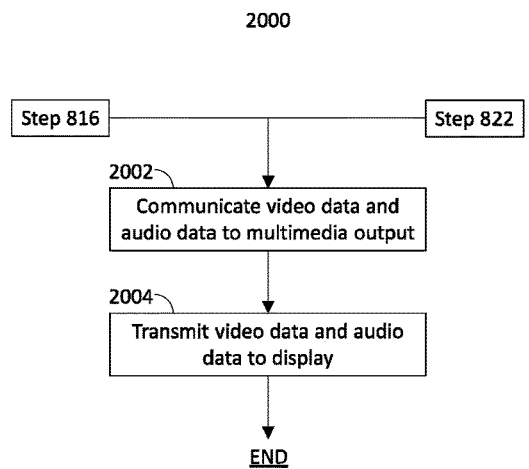
FIG. 20 is a flowchart representing a process for outputting multimedia data from the second stand-alone device to a display according to an embodiment of the disclosure.

The flowchart in FIG. 20 describes a process 2000 implemented on control circuitry of the second stand-alone device (e.g., control circuitry 518) to output multimedia data in accordance with some embodiments of the disclosure. If the second stand-alone device receives a processing command, multimedia data processed by control circuitry 518 is communicated at step 2002 to the multimedia output 520 of the second stand-alone device 504. If the second stand-alone device 504 receives an output command, multimedia data processed by control circuitry 508 of the first stand-alone device 502, having been received at multimedia input 514, is communicated directly from multimedia input 514 to multimedia output 520 under direction from control circuitry 518 responsive to the output command. The second stand-alone device 504 may also receive a source multimedia signal from another source, such as an Internet streaming multimedia application. Control circuitry 518 may process a multimedia signal received from the first stand-alone device and a multimedia signal received from another source, such as and Internet streaming multimedia application, simultaneously. The multimedia data from each source signal, whether processed by the first stand-alone device 502 or the second stand-alone device 504, may be routed through a multiplexer as separate inputs to the multiplexer. The multiplexer may be part of control circuitry 518, multimedia output 520, or a separate component, and may be implemented in software, firmware, or hardware. The multiplexer may, automatically, or in response to a user command, output the multimedia data from one input, and not the other. At step 2004, the video and audio data are transmitted from the multimedia output 520 to a display.

Any of these steps described above with relation to FIG. 20 are optional and may be performed in any order or in parallel.

Second stand-alone device 504 may also output a picture-in-picture (PIP) display of multimedia data from more than one source multimedia signal simultaneously. As discussed above, the second stand-alone device 504 may include a video editing module, implemented in software, firmware, or hardware, that is capable of combining multiple multimedia streams into a single output in PIP format. A PIP display may be an inset display overlaid on a main display. A user may choose a position of the PIP inset display using a user interface device. Alternatively, a PIP display may be side-by-side with a main display in either a vertically or horizontally split screen. A user may choose, using a user interface device, which signal is displayed in the main display, and which signal is displayed in the PIP display.

For example, the first stand-alone device 502 may process a source multimedia signal and transmit the multimedia data obtained therefrom to the second stand-alone device, along with an output command. Second stand-alone device 504, in response to the output command, may route the multimedia data through the multiplexer prior as a first input. At the same time, the second stand-alone device 504 may process a multimedia signal from another source such as an Internet streaming multimedia application. The multimedia data obtained therefrom may also be routed through the multiplexer as a second input. Automatically, or responsive to a user input, the multiplexer may be instructed to output one of the inputs and not the other. A user input command may be received to toggle the multiplexer between outputting the first input and the second input. A user input command may also be received instructing the control circuitry to combine the two inputs using a PIP display. The control circuitry may automatically, or in response to a user input command, determine which input to display as the main display and which input to display as the PIP display. A user input command may also be used to toggle the control circuitry between outputting the first input as the main display with the second input as the PIP display and the second input as the main display with the first input as the PIP display. If a channel change command is received from a user input device by the first stand-alone device 502, the second stand-alone device 504 continues to route the multimedia data received from the first stand-alone device through the multiplexer, and does not affect which input is displayed in the PIP display. In this way, the user may change the channel in either the main display or the PIP display without affecting the other display.

The user input device may also include a button or command sequence to determine which of the main and PIP displays is affected by the channel change operations. In one embodiment, the second stand-alone device 504 records which input is being displayed in the main display and which is being displayed in the PIP display. The user interface device may have a dedicated PIP control button that, while depressed, allows the user to control the source of the media being displayed in the PIP window. Depressing the PIP control may transmit a command to the first stand-alone device that the commands that follow are intended to control the PIP window. Alternatively, depressing the PIP control may prepend a PIP control code to any command issued by the user interface device while the PIP control is depressed.

When the first stand-alone device 502 receives a user input command intended to control the PIP window, the first stand-alone device 502 may, through data port 512, query the second stand-alone device to determine the source of the multimedia data in both the main and PIP displays. The second stand-alone device 504 may provide a response, via data port 516, to the first stand-alone device 502. Based on the response, the first stand-alone device directs the user input commands to the proper control circuitry, either directly to control circuitry 508 or, via data port 512, to control circuitry 518 of the second stand-alone device.

As another example, the first stand-alone device 502 may transmit the source multimedia signal to the second stand-alone device 504 for processing. Second stand-alone device 504 may then process the source multimedia signal received from first stand-alone device 502 and simultaneously process another source multimedia signal from another source such as an Internet streaming multimedia application. The multimedia data of both signals are routed separately to the multiplexer as separate inputs to the multiplexer. Automatically, or responsive to a user input command, the multiplexer may be instructed to output one of the inputs and not the other. A user input command may be received to toggle the multiplexer between outputting the first input and the second input. A user input command may also be received instructing the control circuitry to combine the two inputs using a PIP display. The control circuitry may automatically, or in response to a user input command, determine which input to display as the main display and which input to display as the PIP display. A user input command may also be used to toggle the control circuitry between outputting the first input as the main display with the second input as the PIP display, and the second input as the main display with the first input as the PIP display.

In another example, the first stand-alone device 502 hosts the interactive program guide application. When the user selects the interactive program guide, the video and graphics data associated with the interactive program guide are transmitted to the second stand-alone device 504. Second stand-alone device 504 routes the interactive program guide video and graphics data to the multiplexer as a first input. Meanwhile the second stand-alone device processes a source multimedia signal from another source, such as an Internet streaming multimedia application. The multimedia data obtained from the Internet streaming multimedia application is routed to the multiplexer as a second input. Automatically, or responsive to a user input command, the multiplexer may be instructed to output one of the inputs and not the other. A user input command may be received to toggle the multiplexer between outputting the first input and the second input. A user input command may also be received instructing the control circuitry to combine the two inputs using a PIP display. The control circuitry may automatically, or in response to a user input command, determine which input to display as the main display and which input to display as the PIP display. A user input command may also be used to toggle the control circuitry between outputting the first input as the main display with the second input as the PIP display, and the second input as the main display with the first input as the PIP display.

In another example, the first stand-alone device 502 receives a source multimedia signal and determines through, for example, the processes described above, that the multimedia specifications of the source multimedia signal do not exceed the capabilities of the first stand-alone device 502. First stand-alone device 502 also receives a user input command to exclusively process multimedia signals using the second stand-alone device 504. In response to the user command, first stand-alone device 502 foregoes processing the source multimedia signal and transmits the source multimedia signal and a processing command to the second stand-alone device 504, as described above. Second stand-alone device 504 may also simultaneously receive a source multimedia signal from another source such as an Internet streaming multimedia application. Second stand alone device 504 processes both signals and routes the multimedia data from each signal separately to the multiplexer as different inputs. Automatically, or responsive to a user input command, the multiplexer may be instructed to output one of the inputs and not the other. A user input command may be received to toggle the multiplexer between outputting the first input and the second input. A user input command may also be received instructing the control circuitry to combine the two inputs using a PIP display. The control circuitry may automatically, or in response to a user input command, determine which input to display as the main display and which input to display as the PIP display. A user input command may also be used to toggle the control circuitry between outputting the first input as the main display with the second input as the PIP display, and the second input as the main display with the first input as the PIP display.

Figure 21:
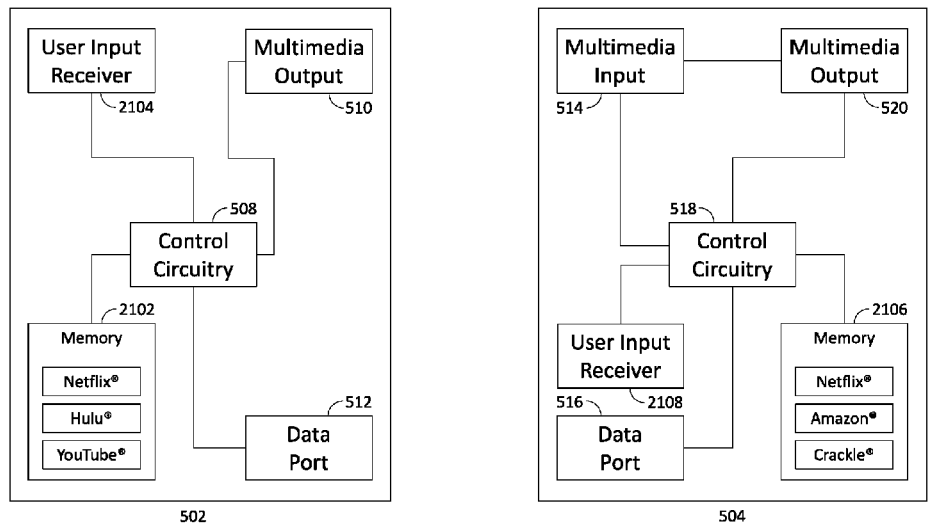
FIG. 21 is a block diagram representing the elements of a system according to an embodiment of the disclosure.

The block diagram in FIG. 21 represents another embodiment of the present disclosure. The first stand-alone device 502 includes a memory 2102 containing a set of multimedia applications, such as Netflix®, Hulu® and YouTube®. Memory 2102 may be implemented by storage 308. Memory 2102 is coupled to control circuitry 508. Control circuitry 508 is further coupled to multimedia output 510 and data port 512. As above, multimedia output 510 may include any suitable multimedia connection, data port 512 may include any suitable data connection, and multimedia output 510 and data port 512 may be electronic components connected to a single physical connection. The first stand-alone device 502 also includes a user input receiver 2104, which may be an infrared receiver module, Bluetooth module, wi-fi module, RF module, or any other communication module suitable for use in receiving user input from a user input device such as a remote control. The control circuitry 508 is configured to receive a user selection of one of the set of multimedia applications resident in memory 2102 from user input receiver 2104, and to determine the capabilities necessary to run the selected application. For example, the control circuitry 508 may compare the recommended amount of random access memory (RAM) for running the selected application to the amount of RAM present on the first stand-alone device 502. Control circuitry 508 may also compare recommended video resolution or other multimedia specifications of the selected application to the capabilities of the first stand-alone device. Control circuitry 508 is also further configured to detect the capabilities of the second stand-alone device 504 and the multimedia applications resident in memory 2106 of the second stand-alone device, for example by requesting the configuration data and an application manifest of the second stand-alone device 504 via a data request sent from data port 512 to data port 516, and receiving a list of capabilities from the second stand-alone device 504 via a response from data port 516 to data port 512. Control circuitry 508 may then compare the recommended amount of RAM for running the selected application to the amount of RAM present on the second stand-alone device 504, and may also compare the recommended video resolution or other multimedia specifications of the selected application to the capabilities of the second stand-alone device 504 detailed in the received configuration data. Control circuitry 508 may also record the amount of time taken by the first stand-alone device 502 to launch the selected application and store that information with the configuration data. Second stand-alone device 504 may also record similar information. Control circuitry 508 may then compare the launch time of the first stand-alone device 502 to the launch time of the second stand-alone device 504, with a shorter launch time being preferable. If control circuitry 508 of the first stand-alone device 502 determines through these comparisons that the capabilities of the second stand-alone device 504 are closer to or exceed the recommended specifications for running the selected application or that the second stand-alone device has a shorter launch time for the selected application, and that the selected application is resident in memory 2106 of the second stand-alone device, control circuitry 508 is configured to transmit a command via data port 512 to the second stand-alone device 504 to launch the selected application.

Second stand-alone device 504 includes multimedia input 514 and data port 516. As above, multimedia input 514 may include any suitable multimedia connection, data port 516 may include any suitable data connection, and multimedia input 514 and data port 516 may be electronic components connected to a single physical connection. Multimedia input 514 and data port 516 are coupled to control circuitry 518, which is further coupled to memory 2106 and multimedia output 520. Memory 2106 may be implemented by storage 308. Memory 2106 contains a set of multimedia applications, at least one of which is common to both memory 2106 and memory 2102. For example, as shown in FIG. 21, memory 2102 and memory 2106 both contain the Netflix® application.

In some embodiments, second stand-alone device 504 may also include a user input receiver 2108, allowing second stand-alone device 504 to receiver user input directly. This may be in addition to or in place of receiving user input relayed by the first stand-alone device 502. For example, a remote control or other user input device may have a dedicated button to control the second stand-alone device. Such user input may be received directly by second stand-alone device 504 through user input receiver 2108. Second stand-alone device 504 may also include a multiplexer module or other similar module which may accept multiple multimedia data streams as input. The multiplexer may be implemented in software, firmware, or hardware, and may be part of control circuitry 518 or multimedia output 520, or may be a separate component. Processed multimedia data that is ready for output may be routed through the multiplexer. Based on instructions received from control circuitry 518, the multiplexer may output a first multimedia data stream or a second multimedia data stream, of a combination thereof. For example, the multiplexer may receive multimedia data processed by the first stand-alone device as a first multimedia data stream, and multimedia data processed by the second stand-alone device as a second multimedia data stream. The control circuitry 518 may, automatically or in response to a user command, instruct the multiplexer to output only the first multimedia data stream. The control circuitry 518 may also instruct the control circuitry to generate a picture-in-picture output by combining one multimedia data stream with an overlay or side-by-side display of another multimedia data stream.

The control circuitry 508 of the first stand-alone device 502 is configured to receive a user selection of one of the set of multimedia applications resident in memory 2102 from user input receiver 2108, and to determine the capabilities necessary to run the selected application. For example, the control circuitry 508 may compare the recommended amount of random access memory (RAM) for running the selected application to the amount of RAM present on the first stand-alone device 502. Control circuitry 508 may also compare recommended video resolution or other multimedia specifications of the selected application to the capabilities of the first stand-alone device. Control circuitry 508 is also further configured to detect the capabilities of the second stand-alone device 504 and the multimedia applications resident in memory 2106 of the second stand-alone device, for example by requesting the configuration data and an application manifest of the second stand-alone device 504 via a data request sent from data port 512 to data port 516, and receiving a list of capabilities from the second stand-alone device 504 via a response from data port 516 to data port 512. Control circuitry 508 may then compare the recommended amount of RAM for running the selected application to the amount of RAM present on the second stand-alone device 504, and may also compare the recommended video resolution or other multimedia specifications of the selected application to the capabilities of the second stand-alone device 504 detailed in the received configuration data. Control circuitry 508 may also record the amount of time taken by the first stand-alone device 502 to launch the selected application and store that information with the configuration data. Second stand-alone device 504 may also record similar information. This may be accomplished by either device using a counter. Specifically, when the device received the launch command, a counter is initialized, and its value set at zero. The control circuitry then increments the counter by one every millisecond until the application launch sequence is complete and the application is fully running. Once the application is fully running, the control circuitry stops incrementing the counter and stores the value of the counter in the configuration data as a representation of the amount of time, in milliseconds, it took to launch the application. Alternatively, launch times may be stored, locally or remotely, in a database. Launch times may be calculated in advance based on the known available system resources of each model of device and stored in a database, with entries for each known application for each known model of device. The control circuitry 508 of the first stand-alone device 502 may access the database and look up its model and the model of the second stand-alone device to find the launch times for each device for the selected application. Control circuitry 508 may then compare the launch time of the first stand-alone device 502 to the launch time of the second stand-alone device 504, with a shorter launch time being preferable. If control circuitry 508 of the first stand-alone device 502 determines through these comparisons that the capabilities of the second stand-alone device 504 are closer to or exceed the recommended specifications for running the selected application by a certain threshold amount, or that the second stand-alone device has a shorter launch time for the selected application, and that the selected application is resident in memory 2106 of the second stand-alone device, control circuitry 508 is configured to transmit a command via data port 512 to the second stand-alone device 504 to launch the selected application.

In the first stand-alone device, control circuitry 508 may also be configured to detect multimedia specifications of the multimedia application selected from the multimedia applications resident in memory 2102, and process the multimedia signal to obtain multimedia data thereof if the multimedia specifications of the multimedia signal do not exceed the capabilities of the first stand-alone device 502. For example, control circuitry 508 may obtain data relating to the multimedia specifications of the multimedia signal from interactive program guide data. Specifically, the interactive program guide data may be configured to include multimedia specifications for each multimedia application. In response to user selection of a multimedia application, or a specific program available through a multimedia application, from the interactive program guide, control circuitry 508 may retrieve the multimedia specification information for the selected application from the interactive program guide data. Alternatively, control circuitry 508 may access multimedia specifications located in a configuration file or header file of the selected multimedia application. Control circuitry 508 may also retrieve known multimedia specifications from a database. Specifically, control circuitry 508 may receive an application identifier in response to a user selection of a program from the interactive program guide. Control circuitry 508 may then access a database containing multimedia specifications for each application. Using the application identifier received from the interactive program guide, the control circuitry 508 may look up the identified application and retrieve the multimedia specifications for that application. The database may be stored locally within memory (e.g., storage 308), or may be stored remotely, such as on an server (e.g., media guidance data source 418).

Control circuitry 508 is further coupled to multimedia output 510 to transmit the multimedia data to the second stand-alone device 504, and data port 512 to transmit a command to the second stand-alone device 504 to output the multimedia data transmitted from multimedia output 510 to multimedia input 514. If the multimedia specifications of the source multimedia signal do exceed the capabilities of the first stand-alone device 502, the control circuitry 508 is further configured to forego launching of the selected multimedia application and transmit a command to the second stand-alone device 504 to launch the selected multimedia application.

In the second stand-alone device, multimedia input 514 and data port 516 are coupled to control circuitry 518. Control circuitry 518 is further coupled to multimedia output 520. Additionally, multimedia input 514 is directly coupled to multimedia output 520. If the second stand-alone device 504 receives a command at data port 516 from data port 512 of the first stand-alone device 502 to output multimedia data processed by the first stand-alone device 502 and transmitted from multimedia output 510 to multimedia input 514, control circuitry 518 is configured to direct multimedia input 514 to transmit multimedia data directly to multimedia output 520.

Figure 22:
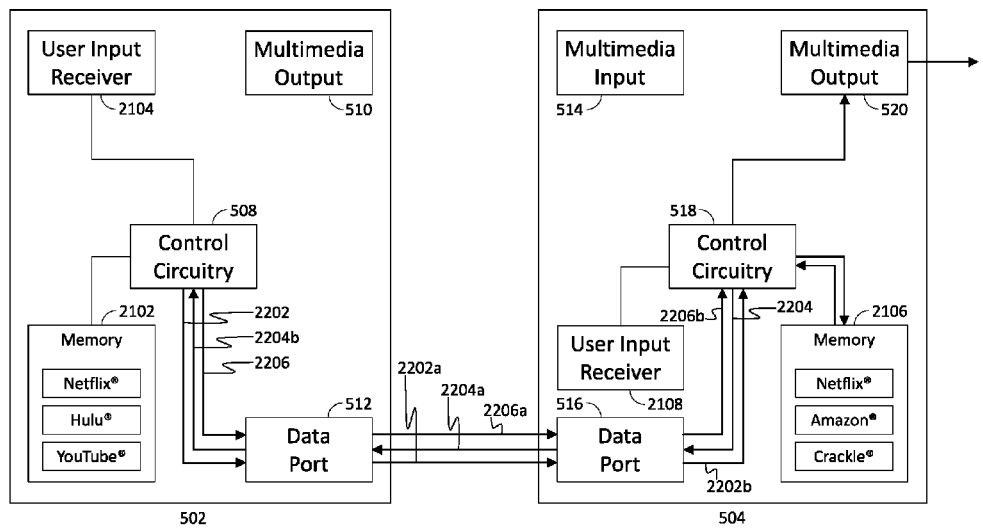
FIG. 22 is a block diagram representing the path of multimedia data and other data according to an aspect of an embodiment of the disclosure.

The block diagram in FIG. 22 shows an aspect of an embodiment of the present disclosure wherein the multimedia specifications of the multimedia signal of the selected application exceed the capabilities of the first stand-alone device 502, or the second stand-alone device 504 configuration is determined by the first stand-alone device 502 to be better suited to running the selected application. The first stand-alone device 502 receives at user input receiver 2104 a user selection of a multimedia application resident in memory 1602, or a selection of a particular program from the interactive program guide that is available through a multimedia application. Control circuitry 508 of the first stand-alone device 502 may make request 2202 for a configuration file and application manifest from the second stand-alone device 504. The request 2202 is communicated to data port 512 and transmitted (2202a) to data port 516.

The request is further communicated (2202b) from data port 516 to control circuitry 518 of the second stand-alone device 504. Control circuitry 518 then issues a response 2204 including the requested data files and communicates the response to the data port 516. The response is transmitted (2204a) from data port 516 to data port 512 of the first stand-alone device 502. The response is further communicated (2204b) to the control circuitry 508 of the first stand-alone device. After making the comparisons described above between the configuration and application manifest of the first stand-alone device and the configuration and application manifest of the second stand-alone device, and between the multimedia specifications of the selected application and the multimedia capabilities of the first and second stand-alone devices, control circuitry 508 may determine that the second stand-alone device is more capable of running the selected application. Control circuitry 508 then issues a command 2206 to the second stand-alone device 504 to launch the selected application and, if a particular program was selected, to being streaming the selected program immediately. The command is communicated to the data port 512 where it is transmitted (2206a) to the data port 516 of the second stand-alone device, and further communicated (2206b) from the data port 516 to the control circuitry 518 of the second stand-alone device 504. Control circuitry 518 then launches the selected application from memory 2106. The multimedia signal generated by the application is processed by control circuitry 518 to obtain multimedia data thereof. The multimedia data is then transmitted to a display through multimedia output 520.

Figure 23:
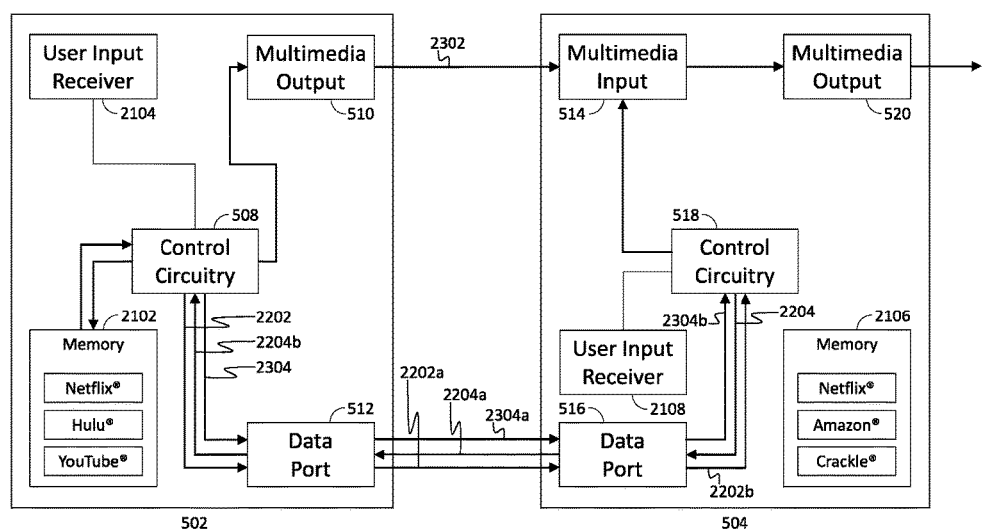
FIG. 23 is a block diagram representing the path of multimedia data and other data according to an aspect of an embodiment of the disclosure.

The block diagram in FIG. 23 shows another aspect of an embodiment of the present disclosure wherein the multimedia specifications of the multimedia signal of the selected application does not exceed the capabilities of the first stand-alone device 502, or the second stand-alone device 504 configuration is determined by the first stand-alone device 502 to be better suited to running the selected application. The first stand-alone device 502 receives at user input receiver 2104 a user selection of a multimedia application resident in memory 2102. Control circuitry 508 of the first stand-alone device 502 may make a request 2202 for a configuration file and application manifest from the second stand-alone device 504. The request 2202 is communicated to data port 512 and transmitted (2202a) to data port 516. The request is further communicated (2202b) from data port 516 to control circuitry 518 of the second stand-alone device 504. Control circuitry 518 then issues a response 2204 including the requested data files and communicates the response to the data port 516. The response is transmitted (2204a) from data port 516 to data port 512 of the first stand-alone device 502. The response is further communicated (2204b) to the control circuitry 508 of the first stand-alone device. After making the comparisons described above between the configuration and application manifest of the first stand-alone device and the configuration and application manifest of the second stand-alone device, and between the multimedia specifications of the selected application and the multimedia capabilities of the first and second stand-alone devices, control circuitry 508 may determine that the first stand-alone device is more capable of running the selected application. Control circuitry 508 of the first stand-alone device 502 launches the selected application from memory 2102. The multimedia signal generated by the selected application is processed by control circuitry 508 to obtain multimedia data 2302. The multimedia data 2302 is transmitted from multimedia output 510 to multimedia input 514. Control circuitry 508 of the first stand-alone device 502 also issues a command 2304 to the second stand-alone device 504 to output the multimedia data 2302 received at multimedia input 514. The command 2304 is communicated to data port 512 where it is transmitted (2304a) to data port 516 of the second stand-alone device 504. The command is further communication (2304b) to control circuitry 518. In response to the command 2304, control circuitry 518 instructs multimedia input 514 to transmit the received multimedia data directly to multimedia output 520, where it is output to a display.

Figure 24:
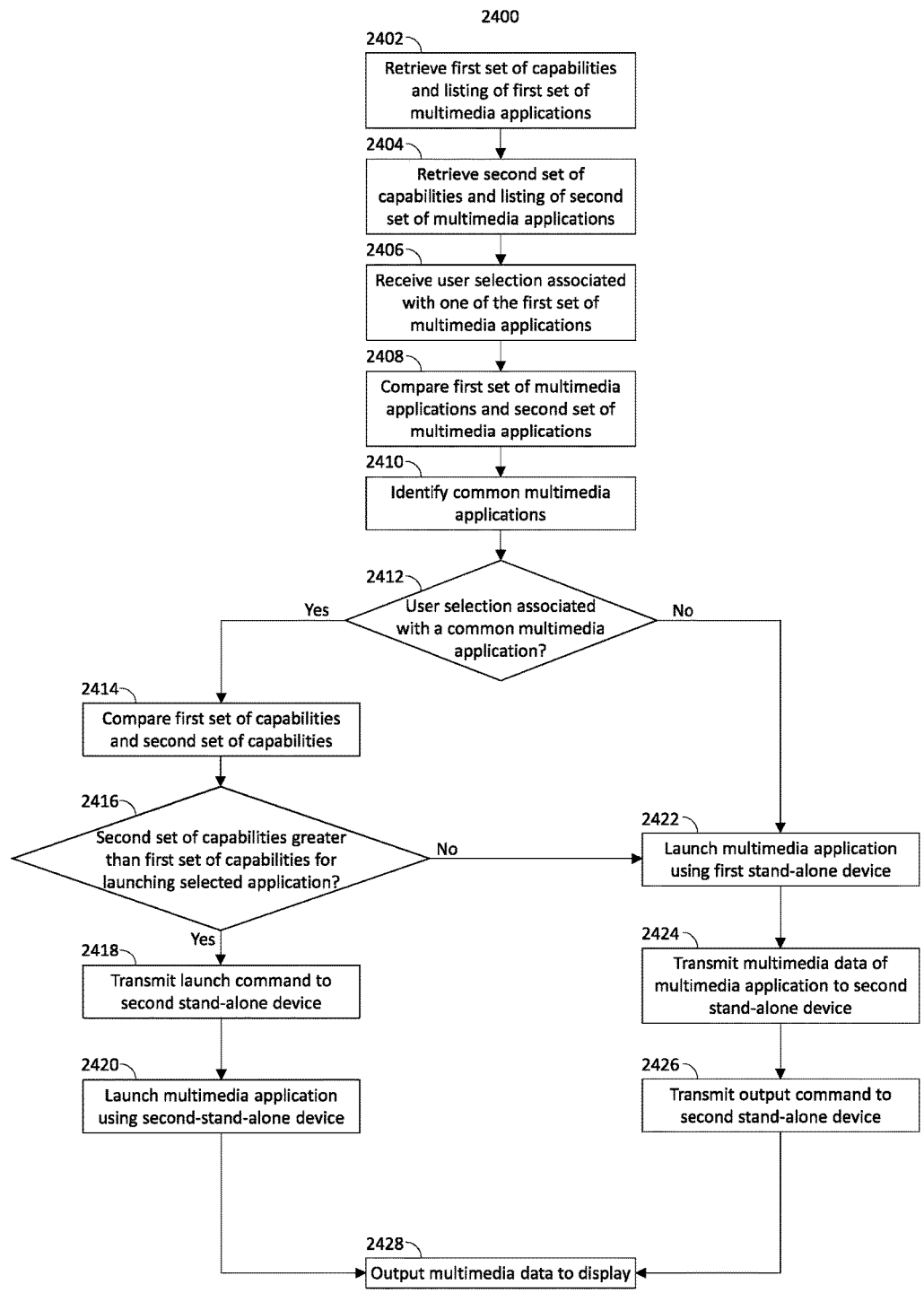
FIG. 24 is a flowchart representing a process for outputting multimedia data according to an embodiment of the disclosure.

The flowchart in FIG. 24 describes the overall process 2400 of an embodiment of the present disclosure to output multimedia data. At step 2402, the first stand-alone device retrieves the capabilities and technical specifications of the first stand-alone device and a listing of the multimedia applications resident in memory 2102. At step 2404, the first stand-alone device retrieves the capabilities and technical specifications of the second stand-alone device and a listing of the multimedia applications resident in memory 2106. Technical specifications may include available RAM, processor speed, and other specifications not relating to the multimedia capabilities of the device. At step 2406, the first stand-alone device receives a user selection associated with a multimedia application. This selection may be received from a dedicated button on a user interface device, or from a selection made from the interactive program guide. For example, grid 102 may include a row relating to a multimedia application. With a user input device, a user can select the row by moving highlight region 110. Control circuitry of the first stand-alone device (e.g., control circuitry 508) then determines that the user selected a program listing for a program that is available and delivered over the Internet from a server of one of the multimedia applications. At step 2408, the control circuitry of the first stand-alone device (e.g., control circuitry 508) compares the listing of multimedia applications resident in memory 2102 with the listing of multimedia applications resident in memory 2106 of the second stand-alone device. At step 2410, the control circuitry 508 of the first stand-alone device 502 identifies, based on the comparison made in step 2408, which multimedia applications are common to both memory 2102 and memory 2106. At step 2412, the control circuitry 508 determines whether the multimedia application associated with the received user selection is one of the identified common multimedia applications. If the multimedia application associated with the received user selection is one of the identified common multimedia applications then, at step 2414, the control circuitry 508 proceeds to compare the capabilities of the first stand-alone device with the capabilities of the second stand-alone device. This comparison is similar to the comparison described above in relation to step 808 of FIG. 8, but in addition to comparing multimedia capabilities, technical capabilities and time required to launch an application are also considered. To do this, the control circuitry 508 requests the multimedia and technical specifications of the second stand-alone device and compares the multimedia and technical specifications obtained at step 1904 to an analogous set of specifications for the first stand-alone device 502 itself. The first stand-alone device 502 may contain a configuration file (e.g., stored in storage 308) or other data detailing the maximum value for each multimedia property found in the multimedia specifications, and each system property such as average launch time for each application, available RAM, or available processing speed. For example, the control circuitry 508 may compare a value in the configuration data relating to video resolution to a video resolution property of the multimedia signal found in the multimedia specifications. If the value of the property found in the multimedia specifications is higher than the value listed in the configuration data, the control circuitry 508 will set a flag or Boolean value to note that at least one property of the multimedia specifications exceeds the capabilities of the first stand-alone device 502. Control circuitry 508 may also make a similar comparison of system properties and may set flags or Boolean values noting if any system properties of the second stand-alone device 504 exceed those of the first stand-alone device 502. Control circuitry may also make a similar comparison of the time required to launch the selected application on the first stand-alone device and the second stand-alone device and may set flags or Boolean values noting if the second stand-alone device launches the selected application in less time than the first stand-alone device. At step 2416, if, after comparing each property of the multimedia specifications to the configuration data, any of the property values are higher than the maximum values found in the configuration data, or if, after comparing system properties of the first and second stand-alone devices, any of the property values of the second stand-alone device 504 are higher than those of the first stand-alone device 502, or if, after comparing application launch times, the second stand-alone device is determined to be faster (i.e., any one of the Boolean values or flags is true), the control circuitry 508 will proceed, at step 2418, to transmit an application launch command to the second stand-alone device. At step 2420, the second stand-alone device launches the application in response to receiving the launch command. At step 2428, multimedia data generated by the multimedia application is then output by the second stand-alone device to a display.

If the control circuitry 508 of the first stand-alone device determines at step 2416 that the multimedia and technical specifications of the second stand-alone device are not greater than those of the first stand-alone device for purposes of running the selected application (i.e., all the Boolean values or flags are false), or if the user selection is not associated with a one of the common multimedia applications, then, at step 2422, the first stand-alone device 502 launches the selected multimedia application. At step 2424, the first stand-alone device transmits the multimedia data generated by the multimedia application to the second stand-alone device. At step 2426, the first stand-alone device transmits a command to the second stand-alone device to output the multimedia data received from the first stand-alone device. Finally, at step 2428, the second stand-alone device output the multimedia data to a display.

Any of these steps described above with relation to FIG. 24 are optional and may be performed in any order or in parallel.

Figure 25:
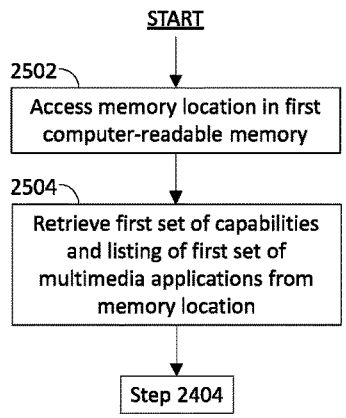
FIG. 25 is a flowchart representing a process for retrieving the capabilities of the first stand-alone device and a listing of multimedia applications available on the first stand-alone device according to an embodiment of the disclosure.

The flowchart in FIG. 25 describes a process 2500 implemented on control circuitry of the first stand-alone device (e.g., control circuitry 508) for retrieving the capabilities of the first stand-alone device and a listing of multimedia applications resident in memory 2102. At step 2502, control circuitry 508 may access a predefined memory location in a memory storage device (e.g., storage 308). The predefined memory location may contain a configuration file or other data structure containing data relating to the multimedia capabilities and system resources of the first stand-alone device, as well as a manifest of multimedia applications installed in memory 2102. At step 2504, control circuitry 508 may retrieve the data stored in the predefined memory location. This can be accomplished in several ways. For example, control circuitry 508 may copy in its entirety the data stored in the predefined memory location, and store the copied data in a RAM buffer or other volatile or non-volatile memory. However, the data stored in the predefined memory location may include additional data that is not relevant to the multimedia capabilities of the first stand-alone device. Control circuitry 508 may therefore parse the configuration data and extract only those data relevant to the multimedia capabilities of the first stand-alone device, such as maximum decodable video resolution, maximum decodable audio sampling rate, closed-captioning ability, subtitle ability, SAP processing ability, available RAM, available processing speed, and recorded times required to launch each multimedia application.

Any of these steps described above with relation to FIG. 25 are optional and may be performed in any order or in parallel.

Figure 26:
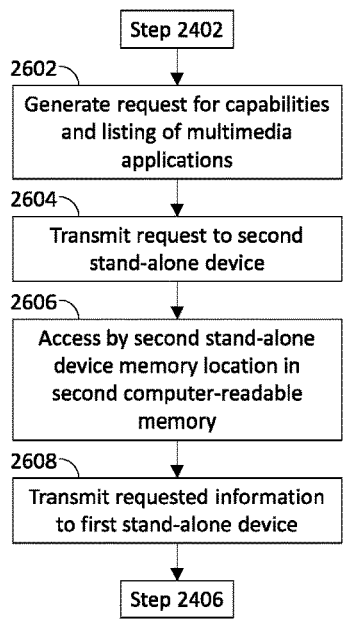
FIG. 26 is a flowchart representing a process for retrieving the capabilities of the second stand-alone device and a listing of multimedia applications available on the second stand-alone device according to an embodiment of the disclosure.

The flowchart in FIG. 26 describes a process 2600 implemented on control circuitry of the first stand-alone device (e.g., control circuitry 508) and the control circuitry of the second stand-alone device (e.g., control circuitry 518) for retrieving capabilities of the second stand-alone device and a listing of multimedia applications resident in memory 2106. At step 2602, the control circuitry 508 of the first stand-alone device 502 generates a request (e.g., request 2202) for configuration data and an application manifest. At step 2604, the request is communicated to the data port 512 and transmitted to the second stand-alone device to be received at data port 516 and communicated to control circuitry 518 of the second stand-alone device 504. At step 2606, the control circuitry 518 may access a predefined memory location in a memory storage device (e.g., storage 308). The predefined memory location may contain a configuration file or other data structure containing data relating to the multimedia capabilities and system resources of the first stand-alone device, as well as a manifest of multimedia applications installed in memory 2106. Control circuitry 518 may retrieve the data stored in the predefined memory location. This can be accomplished in several ways. For example, control circuitry 518 may copy in its entirety the data stored in the predefined memory location, and store the copied data in a RAM buffer or other volatile or non-volatile memory. However, the data stored in the predefined memory location may include additional data that is not relevant to the multimedia capabilities of the first stand-alone device. Control circuitry 518 may therefore parse the configuration data and extract only those data relevant to the multimedia capabilities of the first stand-alone device, such as maximum decodable video resolution, maximum decodable audio sampling rate, closed-captioning ability, subtitle ability, SAP processing ability, available RAM, available processing speed, and recorded times required to launch each multimedia application. At step 2608, the retrieved capabilities and application listings (e.g., response 2204) are communicated to the data port 516 and transmitted to first stand-alone device 502 through data port 512, and further communicated to control circuitry 508.

Any of these steps described above with relation to FIG. 26 are optional and may be performed in any order or in parallel.

Figure 27:
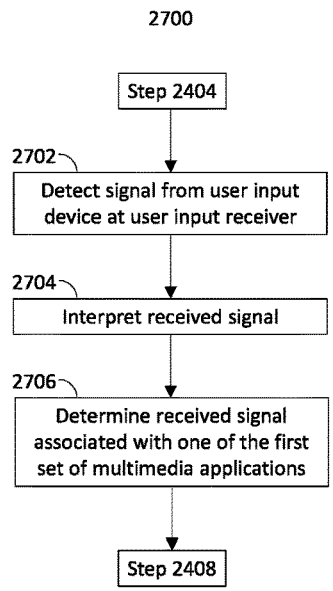
FIG. 27 is a flowchart representing a process for receiving a user selection associated with a multimedia application according to an embodiment of the disclosure.

The flowchart in FIG. 27 describes a process 2700 implemented on control circuitry of the first stand-alone device (e.g., control circuitry 508) for receiving a user selection of a multimedia application. At step 2702, the user input receiver 2104 detects a user input signal from a user input device. A user may make a selection using a remote control, a computer, a smartphone, or any other user input device capable of send a user input signal to the user input receiver 2104. The user input receiver may receive user input signal using any suitable wireless communication means such as RF, infrared, Bluetooth, and wi-fi, or any suitable wired communication means such as a physical switch on the exterior of the first stand-alone device. A user may also use a physical user interface integrated into the first stand-alone device. The user selection command may contain an explicit reference to a specific application to launch, such as from a dedicated application button on a remote control, or may be a generic selection command, such as pressing an "OK" button while a certain multimedia application is highlighted in an interactive program guide. A generic selection command requires additional processing to associate a specific multimedia application with the user selection. For example, the user may highlight Internet content listing 118 of grid 102, or one of selectable options 202 associated with a particular multimedia application. Control circuitry 508 may then associate the user selection with the multimedia application associated with the Internet content listing 118 or the one of selectable options 202 to create a complete command sequence for launching the associated application. At step 2704, the user input signal is interpreted. This may be done by an interpreter module within the user input receiver 2104, or by the control circuitry 508. At step 2706, the control circuitry 508 processes the interpreted signal to determine whether the signal is associated with any of the multimedia applications resident in memory 2102.

Any of these steps described above with relation to FIG. 27 are optional and may be performed in any order or in parallel.

Figure 28:
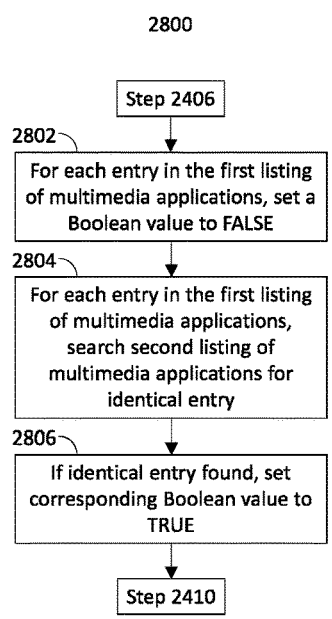
FIG. 28 is a flowchart representing a process for comparing the multimedia applications available on the first stand-alone device with the multimedia applications available on the second stand-alone device according to an embodiment of the disclosure.

The flowchart in FIG. 28 describes a process 2800 implemented on control circuitry of the first stand-alone device (e.g., control circuitry 508) for comparing the list of multimedia applications resident in memory 2102 and the list of multimedia applications resident in memory 2106. At step 2802, the control circuitry 508 initializes a set of Boolean variables corresponding to each of the multimedia applications resident in memory 2102. Each of the Boolean variables is initially set to FALSE. At step 2804, the control circuitry 508 steps through each multimedia application is the retrieved list of multimedia applications resident in memory 2102. For each multimedia application, the control circuitry 508 searches the listing of multimedia applications resident in memory 2106 received from the second stand-alone device 504 for a corresponding list entry. If a corresponding list entry is found, then at step 2806 the Boolean variable corresponding to that multimedia application is set to TRUE.

Any of these steps described above with relation to FIG. 28 are optional and may be performed in any order or in parallel.

Figure 29:
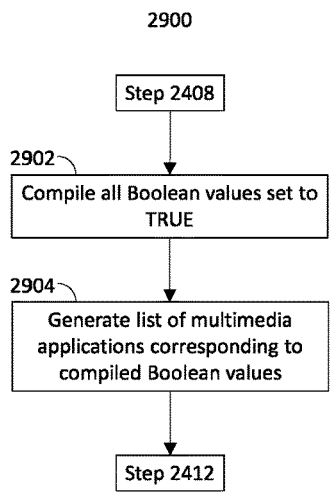
FIG. 29 is a flowchart representing a process for identifying multimedia applications common to both the first stand-alone device and the second stand-alone device according to an embodiment of the disclosure.

The flowchart in FIG. 29 describes a process 2900 implemented on control circuitry of the first stand-alone device (e.g., control circuitry 508) for identifying multimedia applications common to both memory 2102 and memory 2106. At step 2902, control circuitry 508 complies all the Boolean variables initialized in step 2802 corresponding to each multimedia application resident in memory 2102. Control circuitry 508 checks each Boolean variable. At step 2904, control circuitry generates a listing of common multimedia applications by adding a list entry for any multimedia application whose corresponding Boolean variable is set to TRUE.

Any of these steps described above with relation to FIG. 29 are optional and may be performed in any order or in parallel.

Figure 30:
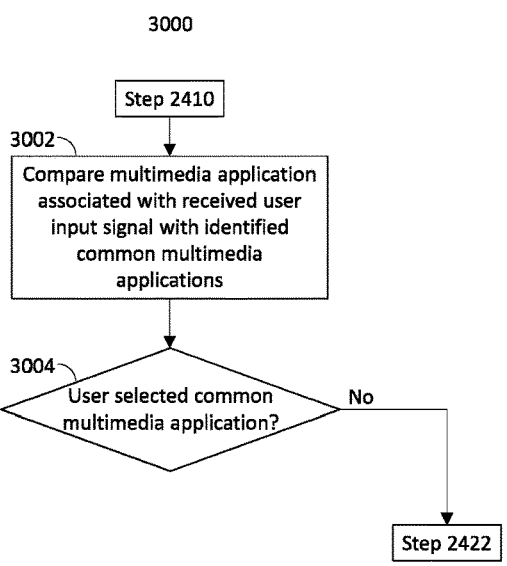
FIG. 30 is a flowchart representing a process for determining is the user selection is associated with a common multimedia application according to an embodiment of the disclosure.

The flowchart in FIG. 30 describes a process 3000 implemented on control circuitry of the first stand-alone device (e.g., control circuitry 508) for determining if the multimedia application associated with the received user selection is one of the common multimedia applications. At step 3002, control circuitry 508 compares the multimedia application associated with the user selection with the generated list of common multimedia applications. At step 3004, control circuitry 508 determines whether the multimedia application associated with the user selection matches any entry in the generated list of common multimedia applications. If a common multimedia application was selected, control circuitry 508 proceeds to step 2414, described below with reference to FIG. 31. If a common multimedia application was not selected, control circuitry 508 proceeds to step 2422, described below with reference to FIG. 35.

Any of these steps described above with relation to FIG. 30 are optional and may be performed in any order or in parallel.

Figure 31:
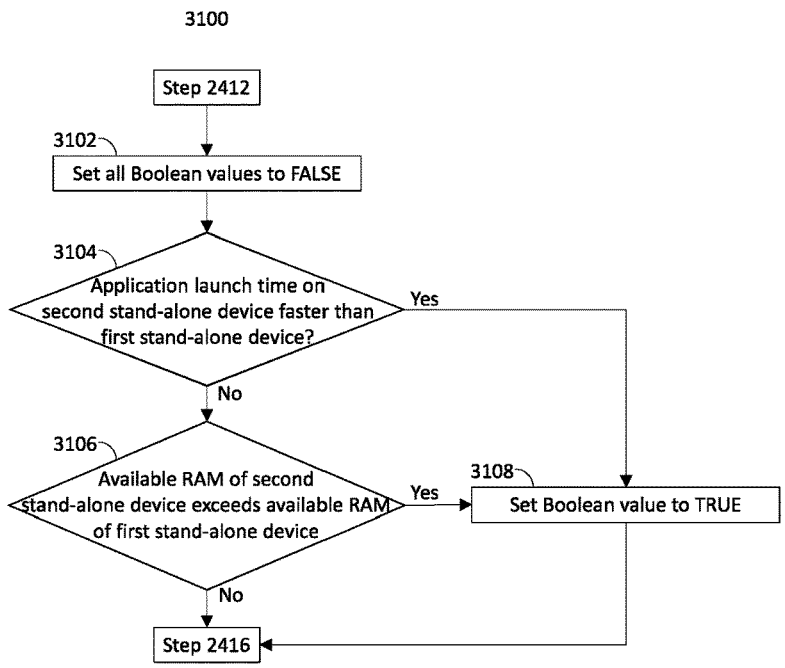
FIG. 31 is a flowchart representing a process for comparing the capabilities of the first stand-alone device with the capabilities of the second stand-alone device according to an embodiment of the disclosure.

The flowchart in FIG. 31 describes a process 3100 implemented on control circuitry of the first stand-alone device (e.g., control circuitry 508) for comparing the capabilities of the first stand-alone device 502 and the second stand-alone device 504. At step 3102, control circuitry 508 initializes a set of Boolean variables, one for each property of the multimedia and technical specifications, and sets the value of each variable to FALSE. As an example, steps 3104 and 3106 compare the recorded amount of time taken by each device to launch the selected multimedia application and the available RAM on each device, respectively. To determine which device will launch the selected multimedia application faster, the control circuitry 508 of the first stand-alone device 502 may locate an entry in the configuration data for the first stand-alone device 502 related to the selected multimedia application. Each time an application is launched, the device on which the launch is executed may record in its configuration data the time elapsed from receipt of the launch command to the time the launch process completed. Control circuitry 508 will also locate an entry for the selected multimedia application in the configuration data received from the second stand-alone device 504. The control circuitry 508 then compares the two launch times to determine which device is faster for launching the selected multimedia application. If the second stand-alone device is faster, or has more available RAM than the first stand-alone device then, at step 3108, the value of the corresponding Boolean variable is set to TRUE. This process is performed for each property of the multimedia and technical specifications relevant to the selected multimedia application.

Any of these steps described above with relation to FIG. 31 are optional and may be performed in any order or in parallel.

Figure 32:
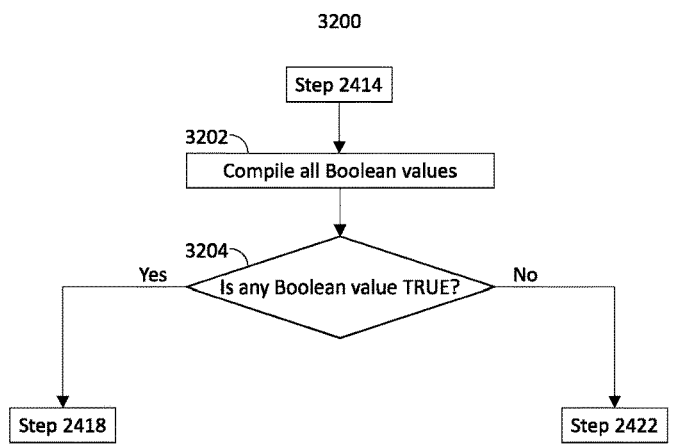
FIG. 32 is a flowchart representing a process for determining whether the capabilities of the second stand-alone device exceed the capabilities of the first stand-alone device according to an embodiment of the disclosure.

The flowchart in FIG. 32 describes a process 3200 implemented on control circuitry of the first stand-alone device (e.g., control circuitry 508) for determining whether the capabilities of the second stand-alone device are greater than the capabilities of the first stand-alone device. At step 3202, control circuitry 508 compiles the Boolean variable initialized in step 3102. At step 3204, control circuitry checks the value of each Boolean variable. If any one Boolean variable is found to have a value of TRUE, the second stand-alone device is determined to have greater capabilities for running the selected application than the first stand-alone device, and control circuitry 508 proceeds to step 2418, described below in relation to FIG. 33. If all the Boolean variables have a value of FALSE, then the first stand-alone device capabilities meet or exceed the multimedia specifications of the multimedia data contained in the source multimedia signal, and control circuitry 508 proceeds to step 2422, discussed below in relation to FIG. 35.

Any of these steps described above with relation to FIG. 32 are optional and may be performed in any order or in parallel.

Figure 33:
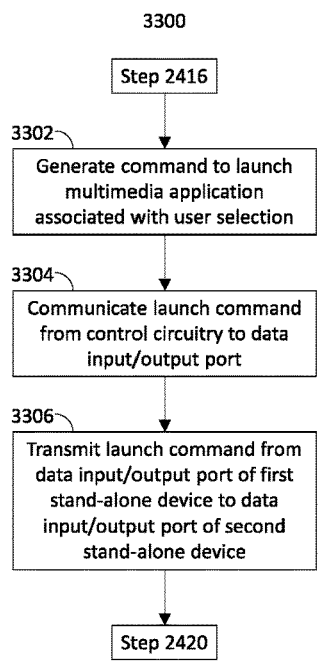
FIG. 33 is a flowchart representing a process for transmitting a launch command to the second stand-alone device according to an embodiment of the disclosure.

The flowchart in FIG. 33 describes a process 3300 implemented on control circuitry of the first stand-alone device (e.g., control circuitry 508) for transmitting a command to the second stand-alone device to launch the selected multimedia application. At step 3302, the control circuitry 508 generates a command (e.g., command 2206) to launch the selected multimedia application. At step 3304, the command is communicated from the control circuitry 508 of the first stand-alone device 502 to the data port 512 of the first stand-alone device 502. At step 3306, the command is transmitted from the data port 512 of the first stand-alone device 502 to the data port 516 of the second stand-alone device 504.

Any of these steps described above with relation to FIG. 33 are optional and may be performed in any order or in parallel.

Figure 34:
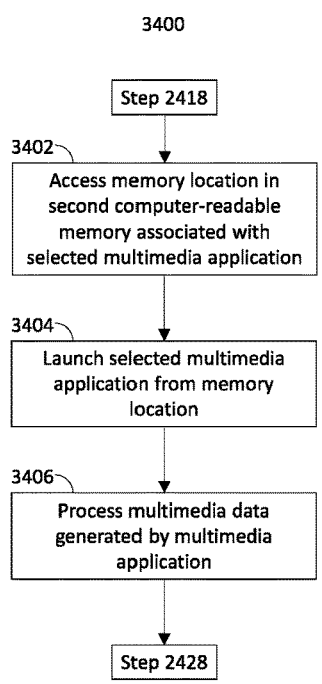
FIG. 34 is a flowchart representing a process for launching a multimedia application using the second stand-alone device according to an embodiment of the disclosure.

The flowchart in FIG. 34 describes a process 3400 implemented on control circuitry of the second stand-alone device (e.g., control circuitry 518) for launching the selected multimedia application on the second stand-alone device and obtaining multimedia data to display. The launch command transmitted from the first stand-alone device 502 is received at the data port 516 of the second stand-alone device 504 and is communicated to control circuitry 518 of the second stand-alone device 504. At step 3402, in response to the command (e.g., command 2206), control circuitry 518 of the second stand-alone device 504 accesses a memory location within memory 2106 associated with the selected multimedia application. At step 3404, control circuitry 508 of the second stand-alone device 504 launches the selected multimedia application from the memory location within memory 2106. At step 3406, the multimedia signal generated by the selected multimedia application is then processed by the control circuitry 518 of the second stand-alone device 504 to obtain multimedia data.

Any of these steps described above with relation to FIG. 34 are optional and may be performed in any order or in parallel.

Figure 35:
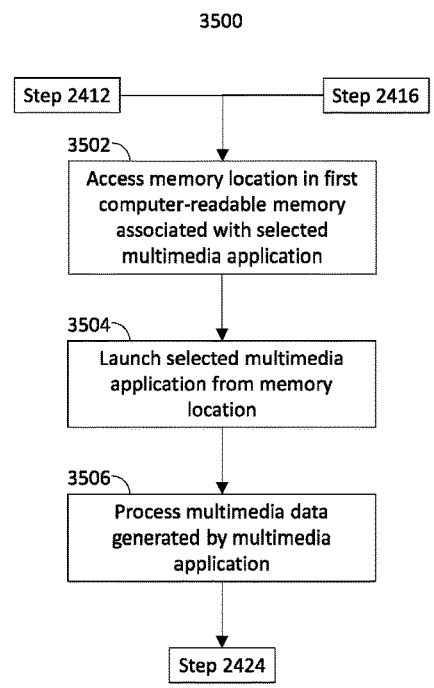
FIG. 35 is a flowchart representing a process for launching a multimedia application using the first stand-alone device according to an embodiment of the disclosure.

The flowchart in FIG. 35 describes a process 3500 implemented on control circuitry of the first stand-alone device (e.g., control circuitry 508) for launching the selected multimedia application on the first stand-alone device and obtaining multimedia data to display. At step 3502, in response to a determination that the selected multimedia application is not one of the common multimedia applications and is resident only in memory 2102 of the first stand-alone device, or that the capabilities of the first stand-alone device are greater for running the selected multimedia application than the second stand-alone device, the control circuitry 508 of the first stand-alone device 502 accesses a memory location within memory 2012 associated with the selected multimedia application. At step 3504, control circuitry 508 launches the selected multimedia application from the memory location within memory 2102. Control circuitry 508 of the first stand-alone device 502 then processes the multimedia signal generated by the selected multimedia application to obtain multimedia data.

Any of these steps described above with relation to FIG. 35 are optional and may be performed in any order or in parallel.

Figure 36:
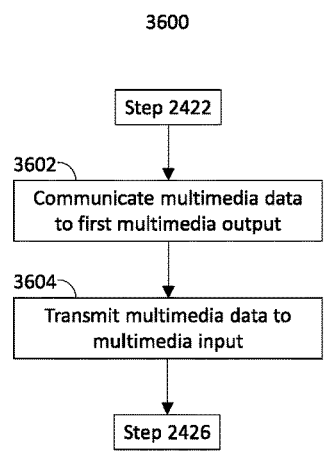
FIG. 36 is a flowchart representing a process for transmitting multimedia data to the second stand-alone device according to an embodiment of the disclosure.

The flowchart in FIG. 36 describes a process 3600 implemented on control circuitry of the first stand-alone device (e.g., control circuitry 508) for transmitting multimedia data obtained from the multimedia signal generated by the selected multimedia application to the second stand-alone device 504 for output. At step 3602, the control circuitry 508 of the first stand-alone device 502 communicates the multimedia data (e.g., multimedia data 2302) to multimedia output 510. At step 3604, the multimedia data 2302 is transmitted from multimedia output 510 of the first stand-alone device 502 to multimedia input 514 of the second stand-alone device 504.

Any of these steps described above with relation to FIG. 36 are optional and may be performed in any order or in parallel.

Figure 37:
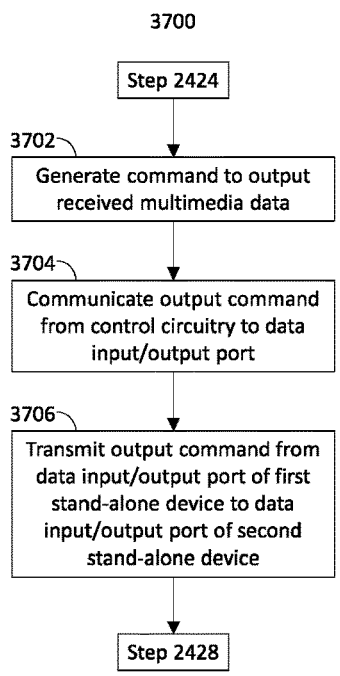
FIG. 37 is a flowchart representing a process for transmitting an output command to the second stand-alone device according to an embodiment of the disclosure.

The flowchart in FIG. 37 describes a process 3700 implemented on control circuitry of the first stand-alone device (e.g., control circuitry 508) for transmitting a command to the second stand-alone device 504 to output the multimedia data received from first stand-alone device 502. At step 3702, control circuitry 508 of the first stand-alone device 502 generates an output command (e.g., command 2304). At step 3704, the command 2304 is communicated to the data port 512 of the first stand-alone device 502 and, at step 3706, transmitted from data port 512 to data port 516 of the second stand-alone device 504. The command 2304 is further communicated to control circuitry 518 of the second stand-alone device 504.

Any of these steps described above with relation to FIG. 37 are optional and may be performed in any order or in parallel.

Figure 38:
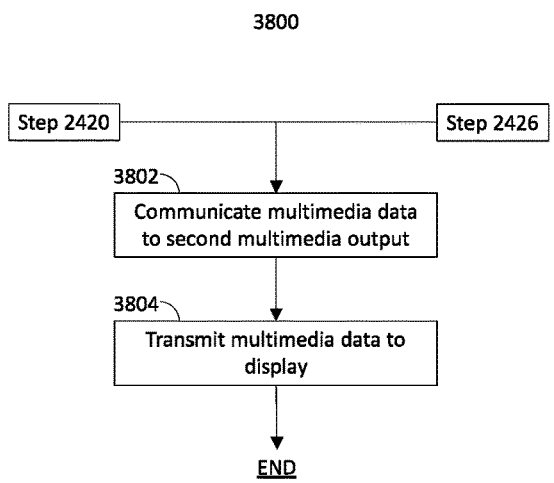
FIG. 38 is a flowchart representing a process for outputting multimedia data from the second stand-alone device to a display according to an embodiment of the disclosure.

The flowchart in FIG. 38 describes a process 3800 implemented on control circuitry of the second stand-alone device (e.g., control circuitry 518) for outputting multimedia data. At step 3802, in response to the command 2304, control circuitry 518 of the second stand-alone device 504 instructs multimedia input 514 to communicate the multimedia data 2302 processed by and transmitted from the first stand-alone device 502 directly to multimedia output 520. Alternatively, if the second stand-alone device 504 received an application launch command, then the multimedia data processed by control circuitry 518 of the second stand-alone device 504 is communicated to multimedia output 520. Finally, at step 3804, the multimedia data is output from multimedia output 520 to a display.

Any of these steps described above with relation to FIG. 38 are optional and may be performed in any order or in parallel.

As an example, a user may wish to watch videos from Netflix® on their television. The user may navigate to an app store to download the Netflix® application to their set-top box or second stand-alone device. Once downloaded, the device may install the application automatically, or require the user to approve the installation. Alternatively, the Netflix® application may be preinstalled on either device by the manufacturer. As part of the application installation process, the device may add an entry to its configuration data for the Netflix® application. Under this entry, the device may record the memory location to which the Netflix® application was installed. The installation process may also integrate the Netflix® program library with the interactive program guide, allowing the user to view listings of programs available on Netflix® along with programs received from the user's cable or satellite television provider. Installation of the Netflix® application may also add a selectable GUI element to the interactive program guide allowing the user to launch the Netflix® application without selecting a particular program. If the user selects this GUI element, the selection is interpreted by the control circuitry as a launch command for the Netflix® application. Before launching the application, the control circuitry determines which device is more capable of running the application, by first detecting whether the application is installed on both devices, and if so by then comparing the specifications of each device against the specifications of the application. The launch command is then processed by whichever device is determined to be more capable. The control circuitry of the determined device accesses the memory location specified in the configuration data during installation. From that memory location, the control circuitry launches the application, which begins running. If the user selects a particular program on Netflix® from the interactive program guide, the selection is interpreted by the control circuitry as a launch command for the Netflix® application with an intent to play the selected program. The control circuitry of the determined device accesses the memory location specified in the configuration data during installation. From that memory location, the control circuitry launches the application, which begins running. Once the control circuitry detects that the application launch sequence successfully completed and the application is running, it passes the intent portion of the command to the Netflix® application, which the Netflix® application may interpret as a command to access and immediately begin playing the selected program. If the determined device is the set-top box, the multimedia data of the program is sent to the second device for output. The second device sends the multimedia data, whether received from the set-top box, or processed by the second device, to the television.

Figure 39:
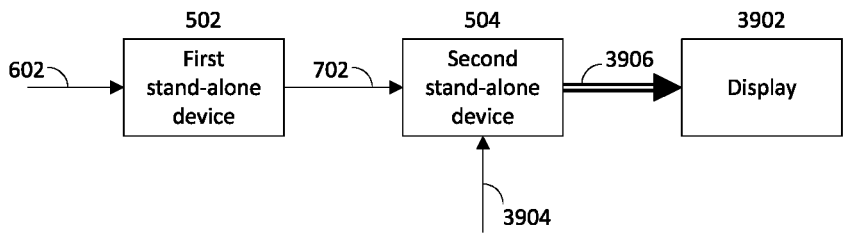
FIG. 39 is a block diagram representing the path of multimedia data according to an embodiment of the disclosure.

In another embodiment, multimedia data from the first stand-alone device 502 may be combined with multimedia data received by second stand-alone device 504 from another source. For example, a user may wish to view a picture-in-picture (PIP) display comprising one program processed by the first stand-alone device 502 and another program processed by the second stand-alone device 504. The control circuitry 518 of the second stand-alone device may be configured to combine the multimedia data received from the first stand-alone device 502 into a main window of the PIP display, and multimedia data processed by the second stand-alone device 504 into a secondary window of the PIP display, or vice versa. As another example, a user may be viewing a program processed by one stand-alone device and wish to view the interactive program guide resident on another stand-alone device. Second stand-alone device 504 may be configured to combine the multimedia data of the program into a secondary window of the PIP display while processing the interactive program guide into a main window of the PIP display. In FIG. 39, first stand-alone device 502 may receive a multimedia signal 602 at multimedia input 506. Control circuitry 508 may process the multimedia signal to obtain multimedia data and communicate the multimedia data to multimedia output 510. Multimedia data is transmitted from multimedia output 510 of the first stand-alone device 502 to multimedia input 514 of second stand-alone device 504.

Second stand-alone device 504 may receive another multimedia signal 3904 from a source other than first stand-alone device 502. For example, second stand-alone device 504 may receive a multimedia signal 3904 from a multimedia application resident in memory 2106. Control circuitry 518 may process the second multimedia signal to obtain multimedia data. To accomplish mixing, control circuitry 518 may include a video multiplexer or other video editing module to combine the multimedia data from the two multimedia signals into a single simultaneous output, such as picture-in-picture. Multimedia data received at multimedia input 514 and multimedia data processed by control circuitry 518 are then further processed together by the video editing module to create combined multimedia data 3906 for output from multimedia output 520 to a display 3902.

Figure 40:
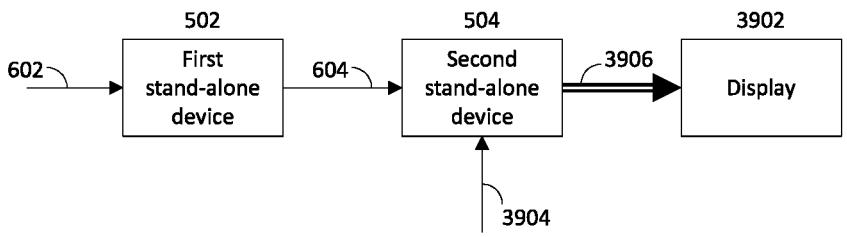
FIG. 40 is a block diagram representing the path of multimedia data according to an embodiment of the disclosure.
Figure 41:
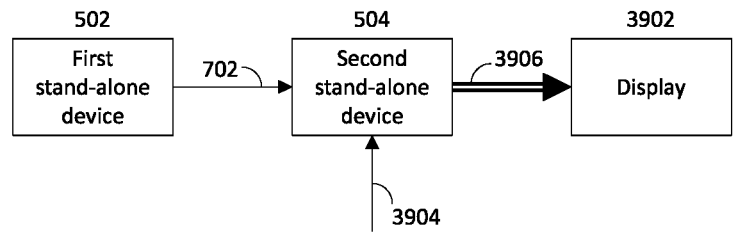
FIG. 41 is a block diagram representing the path of multimedia data according to an embodiment of the disclosure.

In some embodiments, the second stand-alone device 502 may be able to process multiple source multimedia signals simultaneously. For example, control circuitry 518 may include more than one processor or a multi-core processor such as an Intel® Core™2 Duo processor or Intel® Core™ i7-7740X Quad Core processor. First stand-alone device 502 may receive a multimedia signal with specifications exceeding the capabilities of first stand-alone device 502. As described above, first stand-alone device 502 may pass the unprocessed multimedia signal 604, as shown in FIG. 40, or processed multimedia data 702, as show in FIG. 41, to second stand-alone device 504. Second stand-alone device 504 may also receive a multimedia signal 3904 from a multimedia application resident in memory 2106. Control circuitry 518 may then process both signals simultaneously to obtain multimedia data for each signal and then combine them to create a combined multimedia data output 3906 for display.

In some embodiments, the interactive program guide may reside on the second stand-alone device 504. User input for navigating the interactive program guide may be received by the second stand-alone device 504. In response to user selection of a program received at the multimedia input 506 of the first stand-alone device 504, the control circuitry 518 of the second stand-alone device may transmit a command via data port 516 to data port 512 of the first stand-alone device 502 to access the selected program. Alternatively, user input for navigating the interactive program guide may be received by the first stand-alone device 502 and relayed from data port 512 to data port 516 of the second stand-alone device.

As discussed above, the second stand-alone device 504 may also output a PIP display of multimedia data from more than one source multimedia signal simultaneously using a multiplexer or other video editing module. The multiplexer may be part of control circuitry 518 or multimedia output 520, or may be a separate component, and may be implemented in software, firmware, or hardware. Thus, the second stand-alone device may output for display multimedia data of, for example, an interactive program guide output from the first stand-alone device and a streaming program from an Internet streaming multimedia application at the same time. The user may, using a user interface device, control which signal is displayed in the main display and which signal is display in the PIP display, as described above. A PIP display may be an inset display overlaid on a main display. A user may choose a position of the PIP inset display using a user interface device. Alternatively, a PIP display may be side-by-side with a main display in either a vertically or horizontally split screen. A user may choose, using a user interface device, which signal is displayed in the main display, and which signal is displayed in the PIP display.

In some embodiments, second stand-alone device 504 may include other modules not included in FIGS. 5-7 or FIGS. 21-23. For example, second stand-alone device 504 may include a microphone, a video camera, a voice recognition module, or a telephone connection. Some applications may require the use of a microphone or a video camera, such as a video conferencing or other telephonic application.

Some applications may allow users to search for content or give commands verbally if a voice recognition module is present. Some applications, such as multiplayer games, may use a microphone for interplayer communications. Any of these may be present on the second stand-alone device 504.

In some embodiments, the first stand-alone device 502 may receive a user selection of an application requiring the use of one of the modules listed above, but capabilities of the first stand-alone device are otherwise determined to be sufficient for running the selected application. Control circuitry 508 of the first stand-alone device 502 may be configured to transmit a command from data port 512 to data port 516 of the second stand-alone device 504 instructing the second stand-alone device 504 to activate the required module and transmit data received by the required module, such as voice or images captured thereby, to the first stand-alone device 502 via data port 516.

In some embodiments, second stand-alone device 504 receives voice commands from a user via a voice recognition module. The received voice commands may be directed to functions of the first stand-alone device 502 or the second stand-alone device 504. The voice recognition module may be activated using a dedicated button on a user interface device (e.g., a dedicated VOICE button on a remote control associated with first stand-alone device 502, or second stand-alone device 504). Alternatively, the voice recognition module may always be active, and be responsive to a specific "wake" command spoken by the user. In other words, the voice recognition module is in a sleep mode and the user must speak a specific word in order to wake the voice recognition module to process any other commands. Once activated or woken, the voice recognition module may remain active for a certain period of time. If no verbal commands are received by the voice recognition module within that time, the module may deactivate or return to a sleep mode. If a verbal command is given, the voice recognition module may immediately deactivate or return to sleep mode. Control circuitry 518 of the second stand-alone device 504 may be configured to process the voice command received at the voice recognition module and generate a corresponding command. If the received command is directed to functions of the first stand-alone device 502, control circuitry 518 of the second stand-alone device 504 may transmit the generated corresponding command from data port 516 to data port 512 of the first stand-alone device 502. For example, the user may say "Channel Up" and the voice recognition module interprets that verbal command as a command to change the currently tuned channel on the first stand-alone device to the channel whose channel number is one above the channel number of the currently tuned channel. Control circuitry 518 of the second stand-alone device 504 may then relay this command to the first stand-alone device 502 via data port 512. Control circuitry 508 of the first stand-alone device 502 may be configured to receive this command and process it as though it were received at user input receiver 2104. If the received command is directed to functions of the second stand-alone device 504, control circuitry 518 may be configured to process the generated corresponding command as though it were received at user input receiver 2108.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in an one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for displaying a multimedia signal, the method comprising:
   detecting, at a first stand-alone device having a first set of capabilities, a first computer-readable memory and a first set of multimedia applications resident in the first computer-readable memory, a second set of capabilities of a second stand-alone device coupled to the first stand-alone device and to a display and having a second computer-readable memory and a second set of multimedia applications resident in the second computer-readable memory, the first set of multimedia applications and the second set of multimedia applications having at least one common multimedia application, each multimedia application configured to generate a multimedia signal comprising multimedia data;
   detecting, at the first stand-alone device, within the second computer-readable memory the at least one common multimedia application;
   determining whether the second set of capabilities are greater that the first set of capabilities for launching the at least one common multimedia application based on the second set of capabilities; and
   in response to determining that the second set of capabilities are greater than the first set of capabilities for launching the at least one common multimedia application, transmitting a first command to the second stand-alone device to launch the at least one common multimedia application; and
   in response to determining that the second set of capabilities are not greater than the first set of capabilities for launching the at least one common multimedia application, launching the at least one common multimedia application and transmitting the multimedia data of the multimedia signal generated by the at least one common multimedia application to the second stand-alone device, and transmitting a second command to the second stand-alone device to output the multimedia data to the second multimedia output; and
   selectively outputting from the second stand-alone device the multimedia data received by the second device and the multimedia data generated by the at least one common multimedia application resident in the second computer-readable memory on the second stand-alone device based on commands received via the data input of the second stand-alone device.

2. The method of claim 1 wherein the second set of capabilities comprises a higher maximum decodable video resolution than the first set of capabilities.

3. The method of claim 1 wherein the first set of capabilities comprises a higher maximum decodable audio sampling rate than the first set of capabilities.

4. The method of claim 1 wherein the second set of capabilities comprises a network connection.

5. The method of claim 1 wherein the first stand-alone device receives commands from a user input device and relays the commands from the data output of the first stand-alone device to the data input of the second stand-alone device.

6. The method of claim 1 wherein the second stand-alone device receives commands from a user input device.

7. The method of claim 1 wherein the first command and second command are transmitted from the data output of the first stand-alone device to the data input of the second stand-alone device.

8. The method of claim 1 wherein the multimedia data of the multimedia signal is transmitted from the first multimedia output of the first stand-alone device to the second multimedia input of the second stand-alone device.

9. The method of claim 1 wherein the multimedia data of the multimedia signal is transmitted from the data output of the first stand-alone device to the data input of the second stand-alone device.

10. The method of claim 1 further comprising selectively combining at the second stand-alone the multimedia data of the multimedia signal received from the first stand-alone device with multimedia data from a second multimedia signal to generate a combined multimedia data for output from the second multimedia output of the second stand-alone device.

11. A system for displaying a multimedia signal, the system comprising:
   a first stand-alone device having a first computer-readable memory, a first set of capabilities, a first multimedia output, a data output, and a first set of multimedia applications resident in the first computer-readable memory, each multimedia application configured to generate a multimedia signal comprising multimedia data, wherein the first stand-alone device is coupled to a second stand-alone device;
   wherein the second stand-alone device has a second computer-readable memory, a second set of capabilities, a multimedia input, a second multimedia output, a data input, and a second set of multimedia applications resident in the second computer-readable memory, the first set of multimedia applications and the second set of multimedia applications having at least one common multimedia application, wherein the second multimedia output is coupled to a display, and wherein:
      the first stand-alone device comprises control circuitry configured to:
         detect the second set of capabilities;
         detect within the second computer-readable memory the at least one common multimedia application;
         determine whether the second set of capabilities are greater than the first set of capabilities for launching the at least one common multimedia application based on the second set of capabilities; and
         in response to determining that the second set of capabilities are greater than the first set of capabilities for launching the at least on common multimedia application, transmit a first command to the second stand-alone device to launch the at least one common multimedia application; and
         in response to determining that the second set of capabilities are not greater than the first set of capabilities for launching the at least one common multimedia application, launch the at least one common multimedia application and transmit the multimedia data of the multimedia signal generated by the at least one common multimedia application to the second stand-alone device, and transmit a second command to the second stand-alone device to output the multimedia data to the second multimedia output; and
      the second stand-alone device comprises control circuitry to selectively output the multimedia data received at the multimedia input of the second device and the multimedia data generated by the at least one common multimedia application resident in the second computer-readable memory on the second stand-alone device based on commands received via the data input of the second stand-alone device.

12. The system of claim 11 wherein the second set of capabilities comprises a higher maximum decodable video resolution than the first set of capabilities.

13. The system of claim 11 wherein the first set of capabilities comprises a higher maximum decodable audio sampling rate than the first set of capabilities.

14. The system of claim 11 wherein the second set of capabilities comprises a network connection.

15. The system of claim 11 wherein the first stand-alone device receives commands from a user input device and relays the commands from the data output of the first stand-alone device to the data input of the second stand-alone device.

16. The system of claim 11 wherein the second stand-alone device receives commands from a user input device.

17. The system of claim 11 wherein the first command and second command are transmitted from the data output of the first stand-alone device to the data input of the second stand-alone device.

18. The system of claim 11 wherein the multimedia data of the multimedia signal is transmitted from the first multimedia output of the first stand-alone device to the second multimedia input of the second stand-alone device.

19. The system of claim 11 wherein the multimedia data of the multimedia signal is transmitted from the data output of the first stand-alone device to the data input of the second stand-alone device.

20. The system of claim 11 wherein the control circuitry of the second stand-alone device is further configured to selectively combine the multimedia data of the multimedia signal received from the first stand-alone device with multimedia data from a second multimedia signal to generate a combined multimedia data for output from the second multimedia output of the second stand-alone device.

* * * * *